(12) United States Patent
Yamagiwa et al.

(10) Patent No.: US 7,703,798 B2
(45) Date of Patent: Apr. 27, 2010

(54) STRUCTURE OF REAR PORTION OF VEHICLE FURNISHED WITH CURTAIN AIRBAG APPARATUS

(75) Inventors: Tsuyoshi Yamagiwa, Fuchu-cho (JP); Shouichirou Hidaka, Fuchu-cho (JP); Hiroaki Nakao, Fuchu-cho (JP); Motoharu Hirata, Fuchu-cho (JP); Tsutomu Watanabe, Fuchu-cho (JP); Hideharu Saiki, Fuchu-cho (JP); Akihiro Kobayashi, Fuchu-cho (JP)

(73) Assignee: Mazda Motor Corporation (JP)

( * ) Notice: Subject to any disclaimer, the term of this patent is extended or adjusted under 35 U.S.C. 154(b) by 498 days.

(21) Appl. No.: 11/706,238

(22) Filed: Feb. 15, 2007

(65) Prior Publication Data
US 2007/0222192 A1 Sep. 27, 2007

(30) Foreign Application Priority Data
Mar. 24, 2006 (JP) ............................. 2006-082591
Mar. 24, 2006 (JP) ............................. 2006-082592

(51) Int. Cl.
*B60R 21/213* (2006.01)
*B60R 21/215* (2006.01)
(52) U.S. Cl. ................ 280/728.2; 280/730.2; 280/728.3
(58) Field of Classification Search .............. 280/728.2, 280/728.3, 730.2
See application file for complete search history.

(56) References Cited

U.S. PATENT DOCUMENTS 6,786,506 B2 * 9/2004 Yasuhara et al. ......... 280/730.2

| | | | |
|---|---|---|---|
| 2003/0006588 A1 | 1/2003 | Aoki et al. | |
| 2003/0085555 A1 | 5/2003 | Segura | |
| 2004/0150198 A1 | 8/2004 | Totsuka et al. | |

FOREIGN PATENT DOCUMENTS

| EP | 1419940 | | 5/2004 |
|---|---|---|---|
| EP | 1600340 | | 11/2005 |
| JP | 2000-272462 A | * | 10/2000 |
| JP | 2004-189099 | | 7/2004 |
| JP | 2004-314655 | | 11/2004 |

OTHER PUBLICATIONS

European Search Report, EP 07003225, Dated May 4, 2007.

* cited by examiner

*Primary Examiner*—Ruth Ilan
(74) *Attorney, Agent, or Firm*—Studebaker & Brackett PC; Donald R. Studebaker

(57) ABSTRACT

A structure of a rear portion of a vehicle furnished with a curtain airbag apparatus includes a rear pillar, a soft roof trim, a rear pillar trim harder than the roof trim, and a cover constituting part of the rear pillar trim and covering a specific area of a front face portion of the rear pillar trim. The curtain airbag apparatus includes a curtain airbag and an inflator for inflating and deploying the curtain airbag into the vehicle interior along side window glass. The cover of the rear pillar trim can easily be displaced frontward along an airbag deployment joint. When inflated, the curtain airbag fixed to a vehicle body along an upper edge and a rear edge of the side window glass in a retracted position deploys into the vehicle interior upon separating and displacing the cover of the rear pillar trim frontward from the other part thereof.

18 Claims, 14 Drawing Sheets

AREA FIXED TO VEHICLE BODY

STRUCTURE OF REAR PORTION OF VEHICLE FURNISHED WITH CURTAIN AIRBAG APPARATUS

BACKGROUND OF THE INVENTION

1. Field of the Invention

The present invention relates to a structure of a rear portion of a vehicle furnished with a curtain airbag apparatus.

2. Description of the Related Art

It is now common practice to furnish vehicles, in particular motor vehicles, with an airbag system to provide protection to vehicle occupants in the event of a collision or a rollover, for instance. A so-called "curtain airbag," a type of currently available airbags, is designed to inflate and deploy in the vehicle interior to cover side window glass panes. Among curtain airbags of different designs, one has a large length so as to be deployed longitudinally to cover a plurality of side window glass panes which are located separately along a longitudinal direction of a vehicle. For example, Japanese Unexamined Patent Publication No. 2004-189099 discloses this type of curtain airbag which has a considerably large longitudinal dimension to cover all three side window glass panes mounted on each side of a vehicle. When in a retracted state, the curtain airbag of this Publication is fixed to a vehicle body along upper marginal parts of the side window glass panes as well as to a rearmost pillar.

On the other hand, United States Patent Publication No. 2004/0150198 introduces a curtain airbag deployment technique in which a curtain airbag is deployed out from a rear pillar trim with an outside edge portion thereof deformed.

Further, Japanese Unexamined Patent Publication No. 2004-314655 shows a structure in which a trim made of a hard material is provided in the vicinity of an upper edge of side window glass. This Publication does not disclose an arrangement for deploying a curtain airbag from a rear pillar trim, however.

It is desirable that a curtain airbag deployed to cover side window glass from inside a vehicle's passenger compartment, especially in the event of a rollover, exhibit a sufficiently high resistance (or unimpaired tensile force) to withstand an external force which may be exerted on the curtain airbag from inside or outside the vehicle interior. For this reason, the curtain airbag should preferably be fixed to the vehicle body not only at an upper portion but also at a rear end portion which is a portion of the curtain airbag disposed along a rear end part of the side window glass.

A rear pillar is covered by a rear pillar trim to provide an improved appearance as seen from inside the passenger compartment, for instance. The rear pillar trim is generally made of material which is much harder than a soft roof trim covering an inner surface of a roof panel so that the rear pillar trim would not be damaged by cargo or other objects. In a case where the curtain airbag is designed to cover a side window glass pane located immediately in front of the rear pillar which is covered by the rear pillar trim, the portion of the curtain airbag disposed along the rear end part of the side window glass is covered by the rear pillar trim in a retracted state so that the same portion of the curtain airbag is seen from inside the passenger compartment. Since the curtain airbag thus designed is covered by the rear pillar trim from a front side in the retracted state, it is needed, when necessary, to deploy the curtain airbag while causing at least an upper part of a frontal portion of the rear pillar trim to deform frontward.

Since the rear pillar trim is made of a hard material as mentioned above, the rear pillar trim is not so easy to deform. Thus, under conditions where the curtain airbag in the retracted state is positioned considerably inward along a width direction of the vehicle, however, it is necessary to deform the rear pillar trim by an extremely large amount when deploying the curtain airbag. This makes it difficult to ensure smooth inflation and deployment of the curtain airbag, potentially causing a breakage of the upper part of the rear pillar trim.

One approach to securing good deployability of the curtain airbag would be to cause the curtain airbag to stretch out from between an outermost end part of the frontal portion of the rear pillar trim and the side window glass when activated. This will be achieved by storing the curtain airbag situated along the rear end part of the side window glass in the retracted state at a position greatly offset outward along the vehicle width (or at a position as close as possible to the side window glass), or by storing the curtain airbag in such a way that the curtain airbag being deployed is directed somewhat outward along the vehicle width. This approach however is likely to develop a problem that the rear pillar trim becomes susceptible to breakage because the curtain airbag being deployed produces a pushing force which exerts a great locally deforming effect on the outermost end part of the rear pillar trim.

SUMMARY OF THE INVENTION

It is an object of the invention to provide a structure of a rear portion of a vehicle furnished with a curtain airbag apparatus by which the aforementioned problems of the prior art can be solved.

Essentially, the present invention provides a structure of a rear portion of a vehicle in which a specific area of a rear pillar trim acted upon by a pressure produced as a result of inflation and deployment of a curtain airbag is covered by a cover which can easily be separated and displaced frontward from the other part of the rear pillar trim by the inflation and deployment pressure, the cover constituting part of the rear pillar trim.

Specifically, a structure of a rear portion of a vehicle furnished with a curtain airbag apparatus according to the invention is such that side window glass is fitted immediately at the front of a rear pillar which is located at a rear part of a vehicle body, the curtain airbag apparatus including a curtain airbag which is fixed to the vehicle body close to the side window glass in a retracted state and an inflator for supplying gas pressure to the curtain airbag when activated. The curtain airbag apparatus is structured such that the curtain airbag inflated by the gas pressure fed from the inflator deploys into the vehicle interior along the side window glass to cover the side window glass from inside. The curtain airbag is fixed to the vehicle body along an upper edge and a rear edge of the side window glass in the retracted state. The rear pillar is covered by a rear pillar trim from inside the vehicle interior, the rear pillar trim being harder than the roof trim. A specific area of a frontal portion of the rear pillar trim including an outside peripheral part and an upper end part of the frontal portion thereof is covered by a cover constituting part of the rear pillar trim, the cover being so structured as to be easily displaceable frontward along an airbag deployment joint which extends generally vertically at a specific position located inward from the outside peripheral part of the frontal portion of the rear pillar trim. When inflated from the retracted state, the curtain airbag deploys into the vehicle interior upon separating the aforementioned cover from the other part of the rear pillar trim along the airbag deployment joint and displacing the cover frontward.

These and other objects, features and advantages of the invention will become more apparent upon a reading of the following detailed description in conjunction with the accompanying drawings.

DETAILED DESCRIPTION OF THE PREFERRED EMBODIMENTS OF THE INVENTION

The invention is now described in detail with reference to specific embodiments thereof which are illustrated in the accompanying drawings.

First Embodiment

Figure 1:
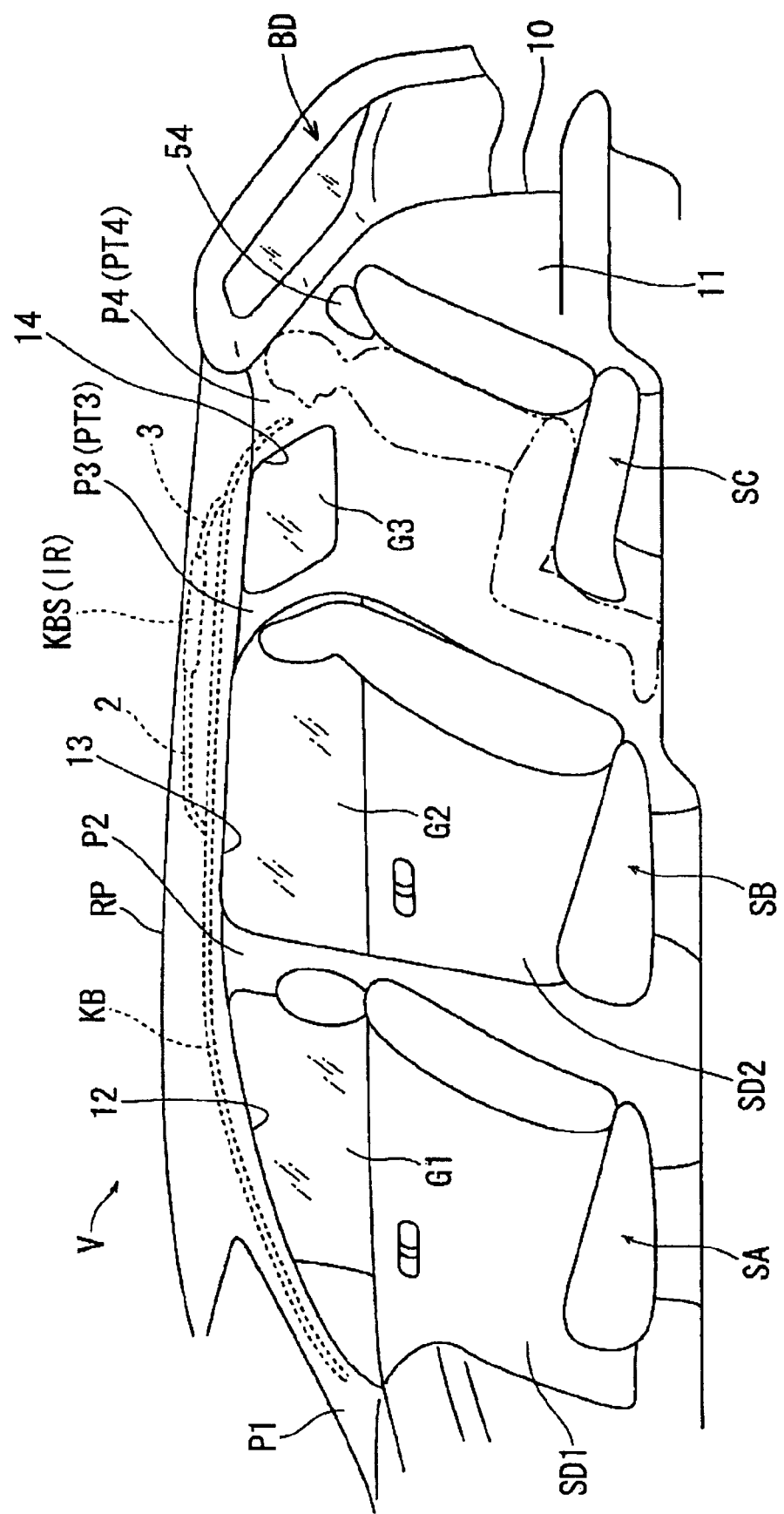
FIG. 1 is a simplified cross-sectional view of a vehicle equipped with a curtain airbag according to a first embodiment of the invention as seen from inside the vehicle interior, in which the curtain airbag is in a retracted state.
Figure 2:
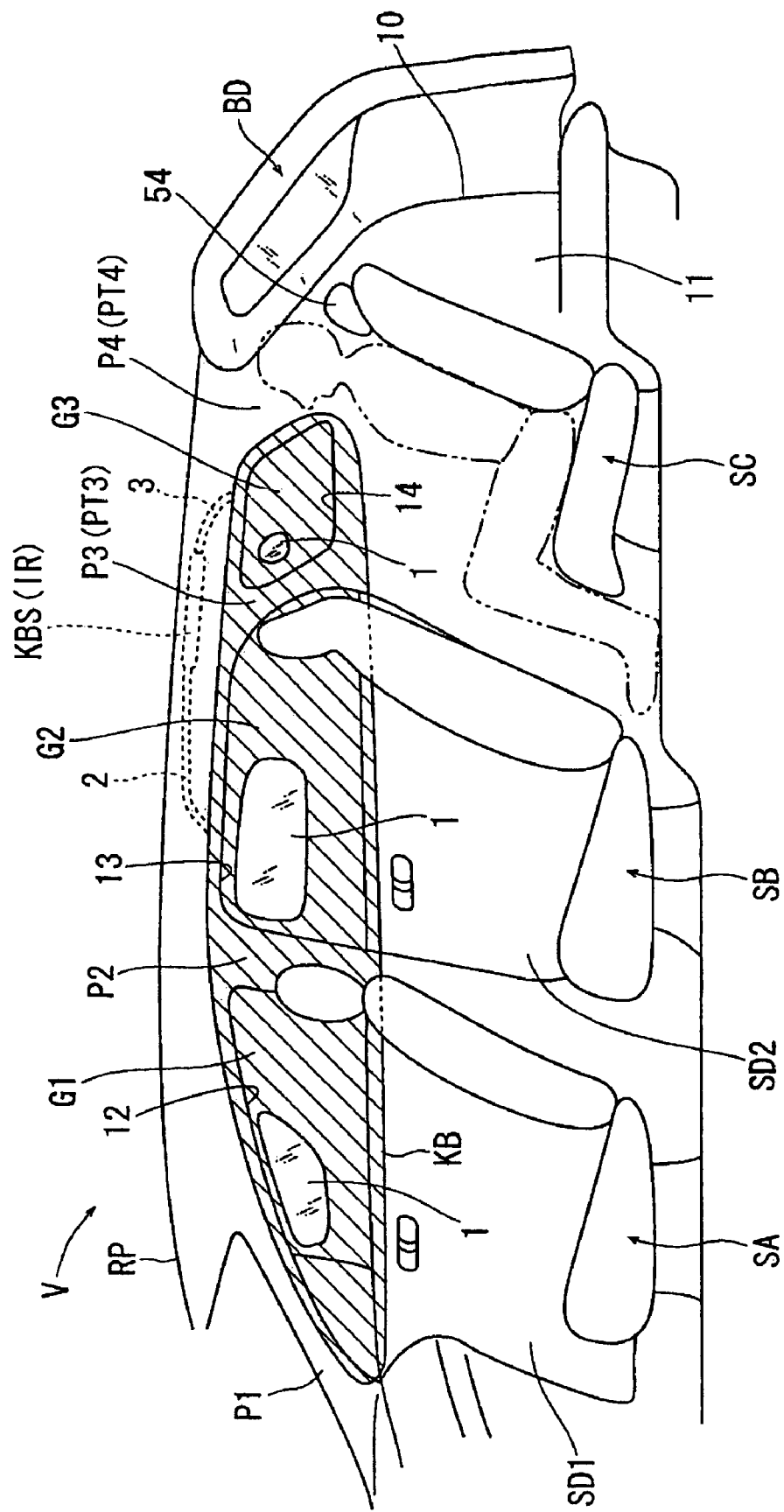
FIG. 2 is a simplified cross-sectional view of the vehicle corresponding to FIG. 1, in which the curtain airbag has been inflated and deployed in the vehicle interior.

Referring to FIGS. 1 and 2, a vehicle V according to a first embodiment of the invention has front seats SA, second-row seats SB installed on the back of the front seats SA and a third-row seat SC installed on the back of the second-row seats SB. The third-row seat SC is a seat which is concerned with the invention in this embodiment. Designated by the symbol SD1 is one of side doors for the front seats SA and designated by the symbol SD2 is one of side doors for the second-row seats SB. The vehicle V also has a plurality of pillars which include, from front to rear, a pair of A-pillars P1, a pair of B-pillars P2, a pair of C-pillars P3 serving as intermediate pillars and a pair of D-pillars P4 serving as rear pillars. Between the left and right D-pillars P4, there is formed a rear-end opening 10 which is opened and closed by a back door BD at a rear end of a vehicle body. Luggage and other cargo can be loaded into and unloaded from a luggage compartment 11 through the rear-end opening 10.

The side door SD1 is furnished with a pane of side window glass G1 which can be moved up and down to close and open a side window. The side door SD1 opens and closes an occupant access opening 12 formed between the A-pillar P1 and the B-pillar P2. The side door SD2 is furnished with a pane of side window glass G2 which can be moved up and down to close and open another side window. The side door SD2 opens and closes an occupant access opening 13 formed between the B-pillar P2 and the C-pillar P3. There is provided a pane of side window glass G3 between the C-pillar P3 and the D-pillar P4. While this side window glass G3 is a fixed-frame type which can not be opened in the present embodiment, a design change may be made to allow the side window glass G3 to be opened and closed. Designated by the reference numeral 14 is a rear side opening which is closed off by the side window glass G3.

A curtain airbag KB is activated in the event of a side-impact collision or a rollover, or when such an accident is predicted. When activated to deploy, the curtain airbag KB covers the aforementioned three side window glass panes G1-G3 almost entirely from inside the vehicle interior. The curtain airbag KB in a retracted state (retracted position) is fixed to the vehicle body along edges of the aforementioned three side window glass panes G1-G3 in the vicinity thereof. More specifically, when the curtain airbag KB is in the retracted position, a forward end portion of the curtain airbag KB is fixed to the A-pillar P1, a rear end portion of the curtain airbag KB is fixed to the D-pillar P4, and a middle portion of the curtain airbag KB between the forward and rear end portions thereof is fixed to the vehicle body on an imaginary line extending longitudinally therealong close to upper edges of the side window glass panes G1-G3. The curtain airbag KB may be fixed to the vehicle body continuously the length of the curtain airbag KB or at specific intervals, for example, as appropriate.

When activated, an inflating portion of the curtain airbag KB shown by hatching in FIG. 2 inflates and deploys generally downward along the three side window glass panes G1-G3 in the vehicle's passenger compartment to cover all of the side window glass panes G1-G3 as illustrated. The curtain airbag KB is made in such a size that, when inflated and deployed, a lower end of the curtain airbag KB is located slightly below a belt line (or below lower edges of the side window glass panes G1-G3). The curtain airbag KB has non-inflating portions 1 which are not hatched in FIG. 2. Since gas pressure is not supplied to the non-inflating portions 1 during deployment of the curtain airbag KB, these portions 1 remain thin without inflating widthwise in effect. The curtain airbag KB is designed such that the non-inflating portions 1 are at positions substantially separated from head positions of vehicle occupants seated on the individual seats SA-SC. Although it is preferable to provide these non-inflating portions 1 for quick inflation and deployment of the curtain airbag KB, the curtain airbag KB may be designed not to include such non-inflating portions. Also, the forward end of the curtain airbag KB may be fixed to the vehicle body at about a mid-length point of a forward end of the A-pillar P1. In this case, it is preferable to join the forward end of the curtain airbag KB to the A-pillar P1 at a point close to the forward end thereof by means of a tether (stringlike member).

Figure 3A:
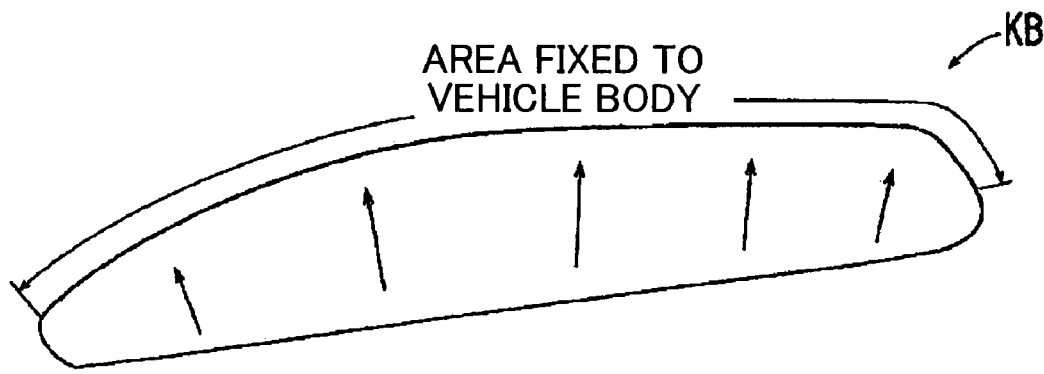
FIG. 3A is diagram showing an initial stage of an example of a process of folding the curtain airbag into the retracted state.
Figure 3B:
FIG. 3B is a diagram showing a stage of the curtain airbag folding process that follows the stage of FIG. 3A.
Figure 3C:
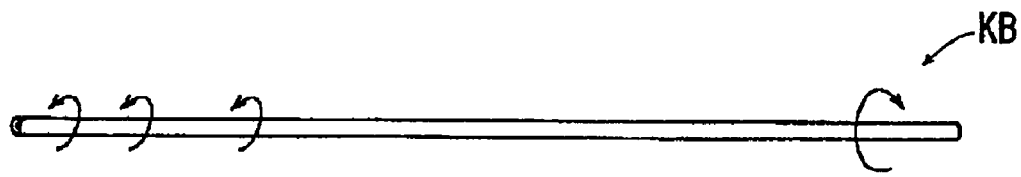
FIG. 3C is a diagram showing a stage of the curtain airbag folding process that follows the stage of FIG. 3B.
Figure 3D:
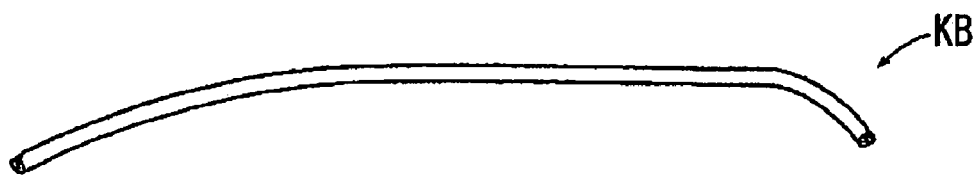
FIG. 3D is a diagram showing a final stage of the curtain airbag folding process that follows the stage of FIG. 3C, particularly indicating how the curtain airbag is shaped at the end of the folding process.

FIGS. 3A to 3D are diagrams showing an example of how the curtain airbag KB is folded in the retracted state. First, the curtain airbag KB is laid stretched in a thin form (refer to FIG. 3A). The curtain airbag KB is folded upward from the lower end thereof in a bellowslike fashion (refer to FIG. 3B) until the curtain airbag KB is contracted into a rodlike form (refer to FIG. 3C). The curtain airbag KB in the rodlike form (FIG. 3C) has generally a square cross-sectional shape, for instance. The curtain airbag KB may be folded in a desired fashion by using an appropriate folding technique. For example, the curtain airbag KB in the stretched form (FIG. 3A) may be folded by bending the same alternately frontward and rearward, or only frontward or rearward, from the lower end so that one part lies on another part. Alternatively, the curtain airbag KB may be folded by successively bending the same only frontward or rearward as if the curtain airbag KB is rolled in one direction. It is possible to bend the straight-shaped curtain airbag KB of FIG. 3C by twisting the same at specific parts so that the curtain airbag KB assumes a curved shape with the forward and rear end portions thereof directed downward. In this embodiment, however, the curtain airbag KB is bent such that the forward and rear end portions thereof are curved as shown in FIG. 3D with substantially no such twist to ensure that a direction in which the curtain airbag KB stretches when deployed (or the deploying direction) does not much deviate in a widthwise direction of the vehicle body. The forward end portion of the curtain airbag KB is bent into a curved form directed relatively gently downward to fit sloping form of the A-pillar P1. On the other hand, the rear end portion of the curtain airbag KB is bent more sharply as compared to the forward end portion to fit sloping form of the D-pillar P4, because the D-pillar P4 extends generally in a straight line almost in an upright position. Under conditions where the curtain airbag KB in the retracted position is fixed to the vehicle body, the rear end portion of the curtain airbag KB extends downward in a curved form from a rear end of the upper edge of the side window glass G3 along an upper part of a rear edge of the side window glass G3 in such a manner that a bottom end of the rear end portion of the curtain airbag KB does not reach the proximity of the lower edge of the side window glass G3 or a lower end thereof. In this embodiment, the bottom end of the rear end portion of the curtain airbag KB in the retracted position is located approximately at a mid-point of the generally vertical rear edge of the side window glass G3 (refer to FIG. 1).

Designated by the symbol IR in FIGS. 1 and 2 is an inflator fixed to vehicle body. When activated, the inflator IR supplies gas pressure to the curtain airbag KB in the retracted position for inflation and deployment thereof. In this embodiment, the gas pressure produced when an explosive contained the inflator IR is ignited is supplied to the curtain airbag KB in the retracted position through a pair of channels, that is, forward and rearward feed channels 2, 3 depicted in FIGS. 1 and 2. The forward feed channel 2 supplies the gas pressure into the retracted curtain airbag KB from approximately a mid-length point thereof. The rearward feed channel 3 supplies the gas pressure into the retracted curtain airbag KB from a point close to the rear end thereof. The number of feed channels and gas pressure feeding points of the curtain airbag KB may be altered as appropriate. The curtain airbag KB, the inflator IR and the feed channels 2, 3 configured as described above constitute essential parts of a curtain airbag apparatus KBS of the embodiment.

Figure 4:
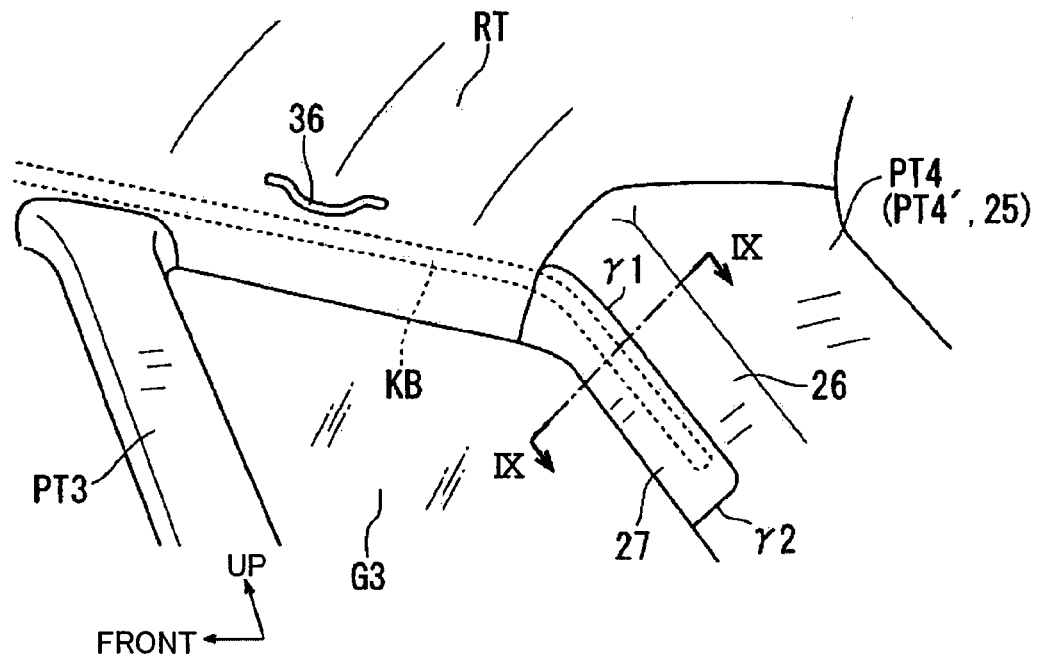
FIG. 4 is a perspective view of the vehicle interior showing an area around a rear pillar trim.
Figure 5:
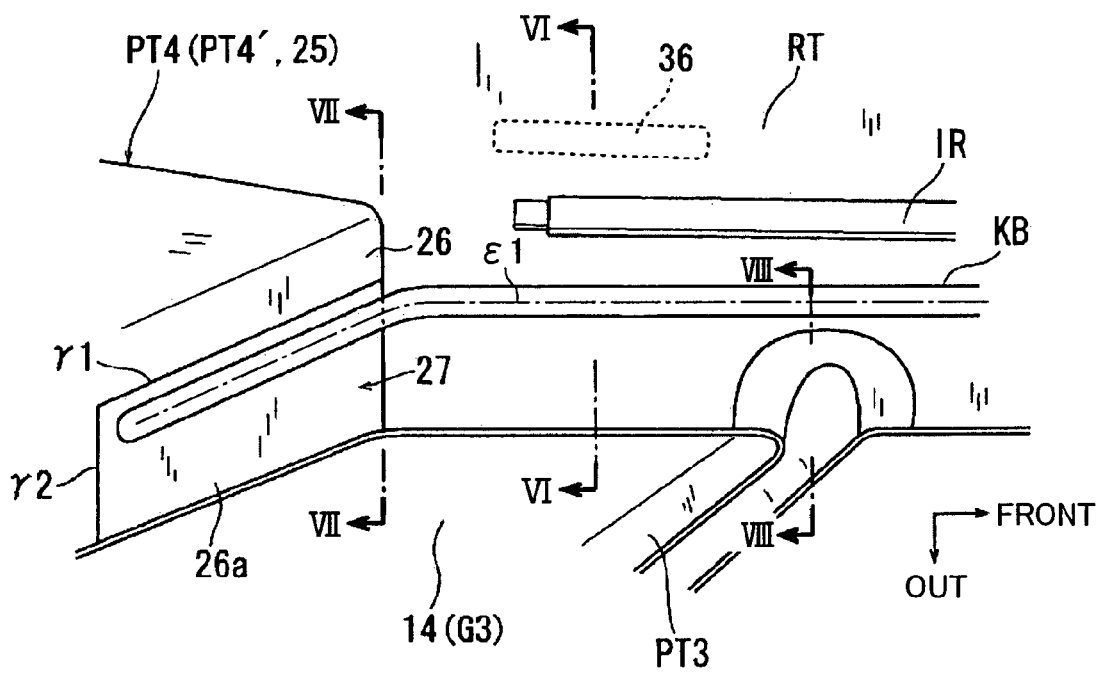
FIG. 5 is a plan view showing an example of how the curtain airbag is arranged near the rear pillar trim in the retracted state.
Figure 6:
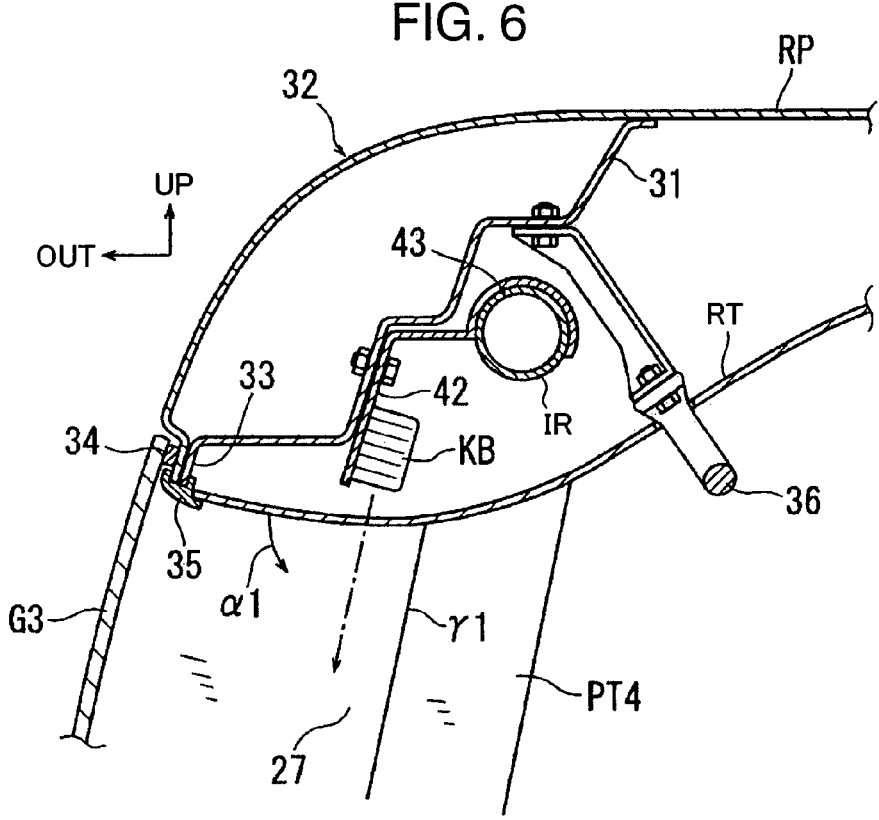
FIG. 6 is a cross-sectional view taken along lines VI-VI of FIG. 5.
Figure 7:
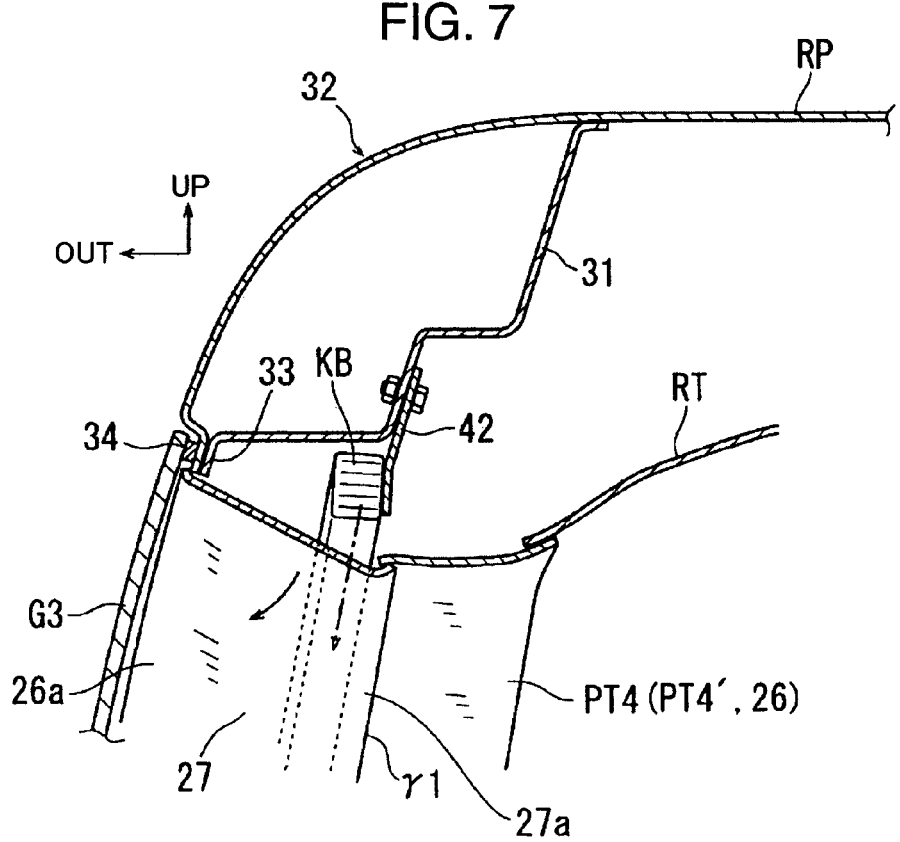
FIG. 7 is a cross-sectional view taken along lines VII-VII of FIG. 5.

The aforementioned pillars P1-P4 are covered by respective pillar trims from inside the vehicle interior. FIG. 4 is a perspective view of the vehicle interior showing an area around a rear pillar trim, FIG. 5 is a plan view showing an example of how the curtain airbag KB is arranged near the rear pillar trim in the retracted position, FIG. 6 is a cross-sectional view taken along lines VI-VI of FIG. 5, and FIG. 7 is a cross-sectional view taken along lines VII-VII of FIG. 5. Referring to FIGS. 4 to 7, the pillar trim covering the C-pillar P3 is referred to as the "intermediate pillar trim" and designated by the symbol "PT3," while the pillar trim covering the D-pillar P4 is referred to as the "rear pillar trim" and designated by the symbol "PT4." Also, an interior side of a roof panel RP of the vehicle V is covered by a roof trim RT (refer especially to FIGS. 6 and 7). It is to be noted that the roof trim RT is not shown in FIGS. 1 and 2. The roof trim RT is a soft trim made of an elastic material, such as a panel of urethane foam whose surface is covered with an unwoven fabric, so that the roof trim RT deforms relatively easily when a small external force is applied with a human hand or fingers, for instance. The individual pillar trims including the intermediate pillar trim PT3 and the rear pillar trim PT4 may be made of harder synthetic resin, such as polypropylene. In particular, the rear pillar trim PT4 is made of polypropylene part of which is structured by thermoplastic olefin (PTO) which will not break even at low temperatures (e.g., −20 degrees C. or less), so that the rear pillar trim PT4 will not easily deform with such a small external force as applied when pushed by the human hand or fingers, for instance. The rear pillar trim PT4 thus structured is harder than the roof trim RT (or "sufficiently hard") to ensure that the same will not easily be damaged as a result of contact with pieces of luggage or the like.

Figure 8:
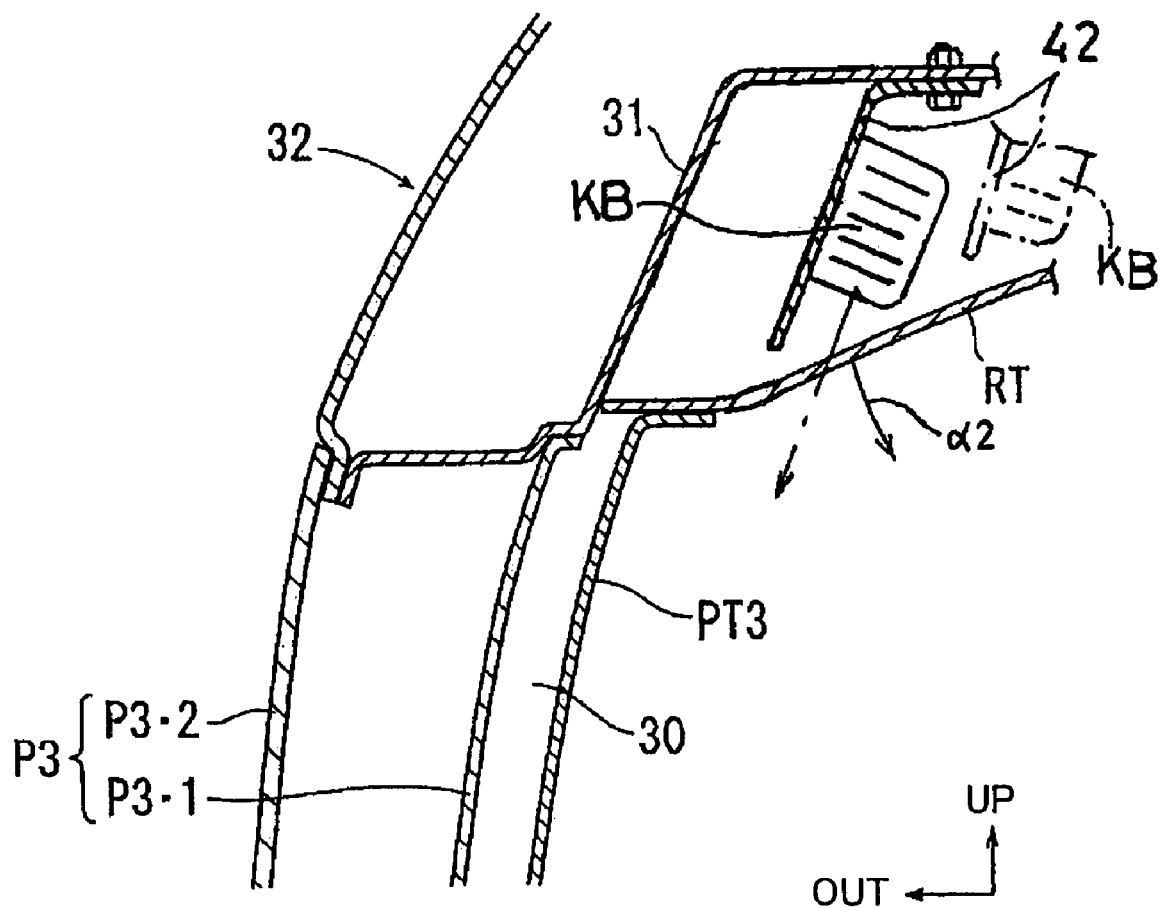
FIG. 8 is a cross-sectional view taken along lines VIII-VIII of FIG. 5.
Figure 9:
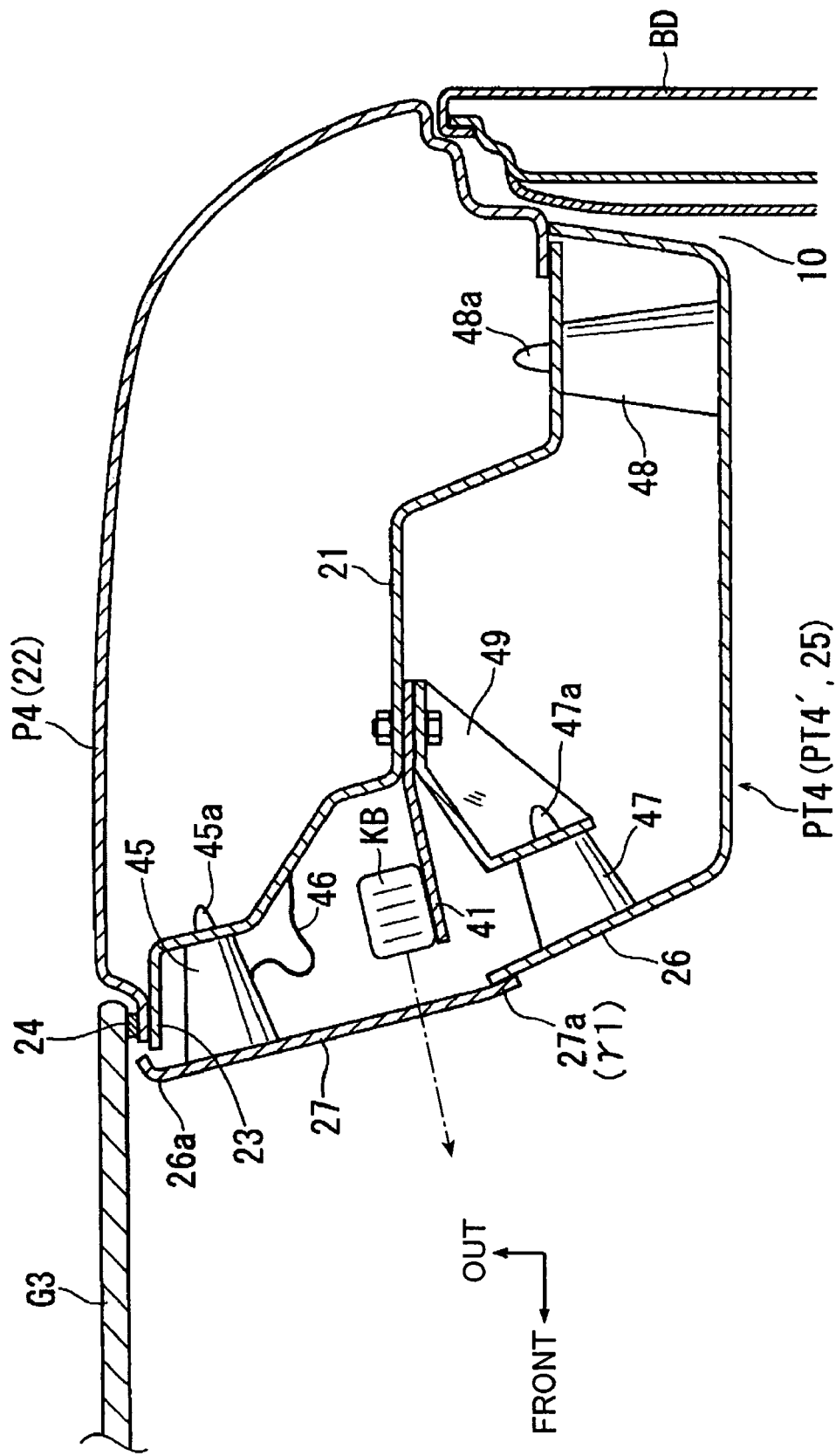
FIG. 9 is a cross-sectional view taken along lines IX-IX of FIG. 4.

FIG. 8 is a cross-sectional view taken along lines VIII-VIII of FIG. 5, and FIG. 9 is a cross-sectional view taken along lines IX-IX of FIG. 4. As depicted in FIG. 9, the rear pillar P4 includes an inner panel 21 and an outer panel 22 which together form a closed section, a forward end of the rear pillar P4 forming a joining flange 23 extending frontward over a small distance. The rear edge of the side window glass G3 is attached to an outer face of the joining flange 23 with adhesive 24. The rear pillar trim PT4 covering the rear pillar P4 thus structured is generally L-shaped in horizontal cross section. Specifically, the rear pillar trim PT4 includes a side face portion 25 extending along a longitudinal direction of the vehicle body over a large distance and a front face portion 26 extending outward along the widthwise direction of the vehicle body over a large distance from a forward end of the side face portion 25, wherein the front face portion 26 is inclined by an angle between 0 to 45 degrees with respect to the widthwise direction in plan view. An outer edge part, or a specific peripheral part 26a, of the front face portion 26 of the rear pillar trim PT4 is located immediately close to the rear edge of the side window glass G3, extending up to the vicinity of the aforementioned joining flange 23.

Referring to FIGS. 4, 5, 7 and 9, a specific area of the front face portion 26 of the rear pillar trim PT4 including the specific peripheral part 26a and an upper end part of the front face portion 26, more particularly, an outermost upper section of the front face portion 26 approximately above a mid-height point thereof, is covered by a separately formed cover member 27 which constitutes part of the rear pillar trim PT4. This means that the outermost upper section of the front face portion 26 is cut out and this cut part of the front face portion 26 is covered by the cover member 27. A portion of the rear pillar trim PT4 other than the cut part of the front face portion 26 which is covered by the cover member 27 constitutes a rear pillar trim body PT4'. Boundaries (generally vertical and horizontal) between the cover member 27 and the rear pillar trim body PT4' serve as airbag deployment joints γ1, γ2. The airbag deployment joint γ1 extends generally vertically in a straight line from approximately the mid-height point of the rear pillar trim PT4 up to an upper end thereof at a position located inward from the peripheral part 26a by a specific distance. The airbag deployment joint γ2 extends outward along the vehicle width from a lower end of the airbag deployment joint γ1 up to the specific peripheral part 26a.

Referring to FIG. 9, an inner edge part 27a of the cover member 27 overlaps the rear pillar trim body PT4' in such a way that the inner edge part 27a is located at the front of the rear pillar trim body PT4'. While the cover member 27 may be lightly bonded to the rear pillar trim body PT4' with a bonding agent at this overlapping part, the cover member 27 and the rear pillar trim body PT4' are not bonded or otherwise fixed together. This means that the cover member 27 and the rear pillar trim body PT4' overlap each other in a manner that allows their relative displacement in the widthwise direction of the vehicle body. With this arrangement, the overlapping part of the inner edge part 27a of the cover member 27 and the rear pillar trim body PT4' serves to absorb dimensional disparities caused by a difference in thermal expansibility (in case of a temperature change) or manufacturing errors thereof. In addition, the aforementioned arrangement of the embodiment in which the overlapping part is located in the front face portion 26 of the rear pillar trim PT4 serves to prevent the cover member 27 from coming off as a result of contact between pieces of luggage being loaded and the overlapping part of the inner edge part 27a of the cover member 27 and the rear pillar trim body PT4'.

The cover member 27 of the rear pillar trim PT4 is fixed to the inner panel 21 with the aid of a retaining projecting part 45a of a support stay 45 projectingly formed on a rear face of the cover member 27 as shown in FIG. 9. The retaining projecting part 45a holding the cover member 27 in position does not exert so large a retaining effect. The retaining projecting part 45a is designed such that while the retaining projecting part 45a holds the cover member 27 with a force which is large enough to ensure that the cover member 27 will not come apart from the inner panel 21 when pulled frontward with fingers, for instance, the retaining projecting part 45a will easily lose its retaining effect and come off the inner panel 21 when acted upon by a large pressure produced as a result of inflation and deployment of the curtain airbag KB. To prevent the cover member 27 from shifting frontward by more than a specific distance when the retaining projecting part 45a comes off, the support stay 45 of the cover member 27 is joined to the inner panel 21 by a slack stringlike connecting member 46, such as a wire. This arrangement ensures that the cover member 27 will not move frontward beyond the aforementioned specific distance when the retaining projecting part 45a comes off the inner panel 21 and the connecting member 46 becomes straight and taut.

The rear pillar trim body PT4' is securely fixed to the inner panel 21 at multiple points in front and rear parts of the rear pillar trim body PT4'. Specifically, there are formed support stays 47, 48 on a back side of the rear pillar trim body PT4', and retaining projecting parts 47a, 48a formed respectively at extreme ends of the support stays 47, 48 are firmly attached to the inner panel 21 via a mounting bracket 49 or directly.

Referring to FIGS. 6 and 7, an outermost end part of the roof panel RP along a side edge thereof is backed by an inner panel (reinforcement) 31, thereby forming a roof side rail 32 which serves as a strengthening member having a longitudinally extending closed section. The roof side rail 32 has along a lower end thereof a joining flange 33 extending slightly downward. An upper marginal part of the side window glass G3 is attached to this joining flange 33 with adhesive 34 (which corresponds to the adhesive 24 shown in FIG. 9). As shown in FIGS. 4 to 6, an outermost side edge part of the roof trim RT which extends slightly outward sideways between the intermediate pillar trim PT3 and the rear pillar trim PT4 is located immediately close to the side window glass G3. The outermost side edge part of the roof trim RT thus structured is held by the joining flange 33 with the aid of an edge molding 35.

Referring to FIGS. 6 to 9, the curtain airbag KB in the retracted position is fixed to vehicle body by such elements as mounting brackets 41 and 42. The mounting bracket 41 shown in FIG. 9 fixes the curtain airbag KB to the rear pillar P4 and the mounting bracket 42 shown in FIGS. 6 to 8 fixes the curtain airbag KB to the roof side rail 32. FIG. 5 shows how the curtain airbag KB in the retracted position is arranged along a portion of the side window glass G3 from the upper edge to the rear edge thereof, in which the aforementioned mounting brackets 41, 42 are not illustrated to permit clear recognition of the arrangement of the curtain airbag KB. A detailed description of the arrangement of the curtain airbag KB in the retracted position will be provided later in the present Specification referring again to FIG. 5.

As shown in FIG. 8, the intermediate pillar (C-pillar) P3 has a conventionally known structure including an inner panel P3-1 and an outer panel P3-2 which together form a closed section. An upper end part of the intermediate pillar trim PT3 covering the intermediate pillar P3 is slightly separated from an inner surface of the intermediate pillar P3 (or the inner panel P3-1) inward in the widthwise direction of the vehicle body so that there is formed a cavity 30 having a specific gap length in the widthwise direction between the intermediate pillar P3 and the intermediate pillar trim PT3. An upper open end of the cavity 30 is closed off by the roof trim RT. A portion of the curtain airbag KB in the retracted position close to the intermediate pillar trim PT3 is located slightly more inward than the upper end part of the intermediate pillar trim PT3 in the widthwise direction of the vehicle body and, moreover, the deploying direction of this portion of the curtain airbag KB is more inward than an inner edge of the upper end part of the intermediate pillar trim PT3 in the widthwise direction of the vehicle body. This arrangement serves to prevent the curtain airbag KB being deployed from interfering with the upper end part of the intermediate pillar trim PT3. According to the invention, the curtain airbag KB may be located at a position offset much more inward than the inner edge of the upper end part of the intermediate pillar trim PT3 in the widthwise direction of the vehicle body as shown by alternate long and short dashed lines in FIG. 8. This alternative arrangement will prevent the curtain airbag KB being deployed from interfering with the intermediate pillar trim PT3 in a more reliable fashion.

Referring to FIG. 6, the inflator IR extending rearward over a large distance is fixed to the roof side rail 32 by means of a mounting bracket 43. As depicted in FIGS. 4 to 6, the roof side rail 32 is fitted with an assist grip 36, a piece of vehicle interior facilities, part of the assist grip 36 gripped by an occupant projecting inward through the roof trim RT in the vehicle interior. While the assist grip 36 is located more inward than the retracted curtain airbag KB and the inflator IR in the present embodiment, this located may be changed such that the assist grip 36 lies between the curtain airbag KB and the inflator IR.

Referring again to FIG. 5, the arrangement of the curtain airbag KB in the retracted position in an area around the rear side opening 14 covered by the side window glass G3 is explained in detail. While FIG. 5 does not show a detailed layout, the roof trim RT is arranged such that small portions of the side edge part of the roof trim RT overlie upper end surfaces of the intermediate pillar trim PT3 and the rear pillar trim PT4. The curtain airbag KB in the retracted position is laid to extend along the longitudinal direction of the vehicle body, in which portions of the curtain airbag KB passing by the intermediate pillar trim PT3 and running along the upper edge of the side window glass G3 are arranged generally in a straight line in plan view (so that the curtain airbag KB would not be offset sideways by more than 5 cm). To be more specific, the distance from the curtain airbag KB to the side window glass G3 (or specific part of the vehicle exterior) remains generally equal at the portions of the curtain airbag KB passing by the intermediate pillar trim PT3 and running along the upper edge and the rear edge of the side window glass G3. In addition, the portion of the curtain airbag KB running along the rear edge of the side window glass G3 is not substantially offset sideways but extends obliquely downward from the rear end of the upper edge of the side window glass G3 while keeping a specific lateral clearance therefrom.

As will be understood from the above discussion, the curtain airbag KB is laid out such that the curtain airbag KB is positioned slightly more inward than the intermediate pillar trim PT3 in the widthwise direction of the vehicle body (refer also to FIG. 8). In other words, to prevent the curtain airbag KB from hitting against the intermediate pillar trim PT3 with which the curtain airbag KB is likely to interfere when deployed, the curtain airbag KB in the retracted position is accommodated slightly more inward than the intermediate pillar trim PT3 in the widthwise direction of the vehicle body, so that the portions of the curtain airbag KB running along the upper edge and rear edge of the side window glass G3 are located generally at the same lateral distance therefrom as the portion of the curtain airbag KB passing by the intermediate pillar trim PT3. The curtain airbag KB in the retracted position is accommodated in as straight a shape as possible so that the curtain airbag KB is not substantially bent or offset sideways all along the portion thereof at and to the rear of the intermediate pillar trim PT3 as discussed above.

The later-discussed deploying direction of the curtain airbag KB thus accommodated is a primary direction in which the curtain airbag KB fixed to the vehicle body at ordinary fixing points stretches out from the retracted position when activated to deploy. If the curtain airbag KB initially stretched out as shown in FIG. 3A is folded upward from the lower end thereof in a bellowslike fashion, for example, the deploying direction of the curtain airbag KB is a generally downward direction in which the lower end of the curtain airbag KB being deployed is directed. In a case where the curtain airbag KB is folded in a bellowslike fashion as stated above, the deploying direction of the curtain airbag KB is normally a direction of an extreme end (lower end) of the curtain airbag KB opposite to the fixing points thereof. In short, the deploying direction of the curtain airbag KB is the direction opposite to the fixing points of the curtain airbag KB. Also, if the curtain airbag KB is folded as if rolled in one direction, the deploying direction of the curtain airbag KB is the direction opposite to the fixing points of the curtain airbag KB.

Referring to FIG. 5, an alternate long and short dashed line marked by the symbol ∈1 is a line connecting points where imaginary lines drawn along the deploying direction intersect the roof trim RT and the cover member 27. The deploying direction of the curtain airbag KB is generally downward along a portion of the curtain airbag KB running along the line ∈1 shown in FIG. 5 at the front of the cover member 27, that is, the portions of the curtain airbag KB passing by the intermediate pillar trim PT3 and running along the upper edge of the side window glass G3 (as shown by arrows extending from the curtain airbag KB in FIGS. 6 to 8). On the other hand, the deploying direction of the curtain airbag KB is generally frontward along the portion of the curtain airbag KB running along the rear edge of the side window glass G3 (as shown by an arrow extending from the curtain airbag KB in FIG. 9).

The curtain airbag KB in the retracted position is arranged such that the deploying direction thereof is generally downward along the portions of the curtain airbag KB passing by the intermediate pillar trim PT3 and running along the upper edge of the side window glass G3 and generally frontward along the portion of the curtain airbag KB running along the rear edge of the side window glass G3 as mentioned above. This means that the curtain airbag KB in the retracted position is disposed without being substantially twisted all along the portion at and to the rear of the intermediate pillar trim PT3. As the portion of the curtain airbag KB running along the rear edge of the side window glass G3 is greatly bent downward from the portion of the curtain airbag KB running along the upper edge of the side window glass G3 (at an angle of 120 degrees, for example), the deploying direction of the curtain airbag KB is made generally frontward (more exactly, obliquely downward toward the front of the vehicle V) at this portion.

The curtain airbag KB in the retracted position is disposed such that its portion along the rear edge of the side window glass G3 is located more outward in the widthwise direction of the vehicle body than the inner edge part 27a of the cover member 27. Specifically, the curtain airbag KB is accommodated such that the same is located at a position between the airbag deployment joint γ1 and the retaining projecting part 45a as close as possible to the airbag deployment joint γ1 formed at the inner edge part 27a of the cover member 27.

Now, advantages of the aforementioned structure of the curtain airbag apparatus KBS are described. When specific conditions for activation of the curtain airbag KB are satisfied with a side-impact collision or a rollover detected or predicted under conditions where the curtain airbag KB is in the retracted position, for instance, the explosive contained the inflator IR is ignited. The gas pressure produced by ignition of the explosive of the inflator IR is fed into the retracted curtain airbag KB, causing the curtain airbag KB to inflate and deploy as shown by hatching in FIG. 2. The result of inflation and deployment of the inflator IR into the vehicle interior is that the portion of the curtain airbag KB running along the upper edge of the side window glass G3 and a portion at the front thereof deploy downward while displacing the outermost side edge part of the roof trim RT downward as shown by an arrow α1 in FIG. 6 and by an arrow α2 in FIG. 8. The roof trim RT can be easily deformed downward because the roof trim RT is made of a soft material.

Close to the rear end of the vehicle body, the curtain airbag KB deploys in such a way that the stretched curtain airbag KB exhibits a tensile force in the longitudinal direction of the vehicle body. Thus, as the rear end portion of the curtain airbag KB deploys frontward, the curtain airbag KB pushes an upper end of the cover member 27 of the rear pillar trim PT4, displacing the cover member 27 frontward. As a consequence, the overlapping part of the inner edge part 27a of the cover member 27 and the rear pillar trim body PT4' is set apart, thereby creating a gap therebetween. The rear end portion of the curtain airbag KB deploys into the vehicle interior through the gap thus created. Especially because the curtain airbag KB in the retracted position is disposed close to the airbag deployment joint γ1 and initially held in place with a small retaining force exerted by the retaining projecting part 45a which is located more outward in the widthwise direction of the vehicle body than the curtain airbag KB, a forward pushing force exerted by the curtain airbag KB being deployed serves to effectively displace the inner edge part 27a of the cover member 27 frontward. If the forward pushing force of the curtain airbag KB exerted on the cover member 27 is equal to or above a specific level, the retaining effect of the retaining projecting part 45a holding the cover member 27 to the inner panel 21 will be canceled out and the cover member 27 will be greatly displaced frontward, allowing the rear end portion of the curtain airbag KB to easily deploy into the vehicle interior without any substantial resisting force from the cover member 27. In this embodiment, an unnecessarily large frontward displacement of the cover member 27 is avoided by the connecting member 46.

As previously mentioned, the curtain airbag KB is accommodated in the retracted position without being substantially twisted along the portion at and to the rear of the intermediate pillar trim PT3 so that the deploying direction of the curtain airbag KB does not much deviate in the widthwise direction of the vehicle body. This arrangement of the embodiment ensures good deployability of the curtain airbag KB. In addition, since the cover member 27 can be displaced frontward with such extreme ease that the entirety of the curtain airbag KB can smoothly deploy into the vehicle interior. The cover member 27, which is acted upon by a pressure produced by deployment of the curtain airbag KB, comes apart from the rear pillar trim body PT4' along the aforementioned deployment joints γ1, γ2, so that the cover member 27 can be displaced frontward extremely easily without forcible deformation or the risk of breakage. The curtain airbag KB in the retracted position is disposed generally in a straight line in plan view along the portions along the upper and rear edges of the side window glass G3. This means that the portion of the curtain airbag KB running approximately at the same height as the upper end of the intermediate pillar trim PT3 at the rear thereof is not located more outward in the widthwise direction of the vehicle body than the portion of the curtain airbag KB passing by the intermediate pillar trim PT3. Therefore, even when the curtain airbag KB deploys in such a way as to create a tensile force acting in the longitudinal direction of the vehicle body, the arrangement of the embodiment serves to prevent the curtain airbag KB from being caught by the intermediate pillar trim PT3.

Since the curtain airbag KB has the inflating portion between the rear pillar trim PT4 and the side window glass G3 as stated earlier, the curtain airbag KB protects the occupant seated in the third-row seat SC over a wide area.

Second Embodiment

Figure 10:
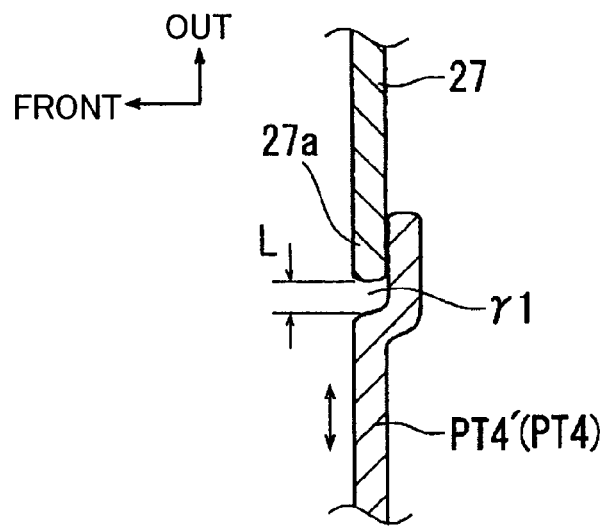
FIG. 10 is a fragmentary enlarged view showing a structure according to a second embodiment of the invention, FIG. 10 corresponding to part of an area shown in FIG. 9.

FIG. 10 is a fragmentary enlarged view showing a structure according to a second embodiment of the invention, the structure shown in FIG. 10 corresponding to part of the structure shown in FIG. 9. In FIG. 10, elements like those of the first embodiment are designated by like reference symbols. In this embodiment, boundary parts of the cover member 27 and the rear pillar trim body PT4' are shaped to overlap in such a way as to become flush with each other. Specifically, an outermost side edge part of the rear pillar trim PT4 is bent slightly rearward in a staggered fashion so that the inner edge part 27a of the cover member 27 overlies this staggered side edge part of the rear pillar trim PT4. At the overlapping part of the inner edge part 27a of the cover member 27 and the rear pillar trim body PT4', there is created a clearance L which separates the cover member 27 from an flat (unbent) part of the rear pillar trim body PT4' in the widthwise direction of the vehicle body. This clearance L serves to absorb dimensional disparities caused by thermal expansion or manufacturing errors, for instance. Since the cover member 27 is flush with the unbent part of the rear pillar trim body PT4' at the overlapping part, this structure serves to improve the appearance of the rear pillar trim PT4 as seen from inside the vehicle interior. In this embodiment, a portion of the rear pillar trim PT4 corresponding to the airbag deployment joint γ2 is structured in the same fashion as the portion corresponding to the airbag deployment joint γ1 shown in FIG. 10.

Third Embodiment

Figure 11:
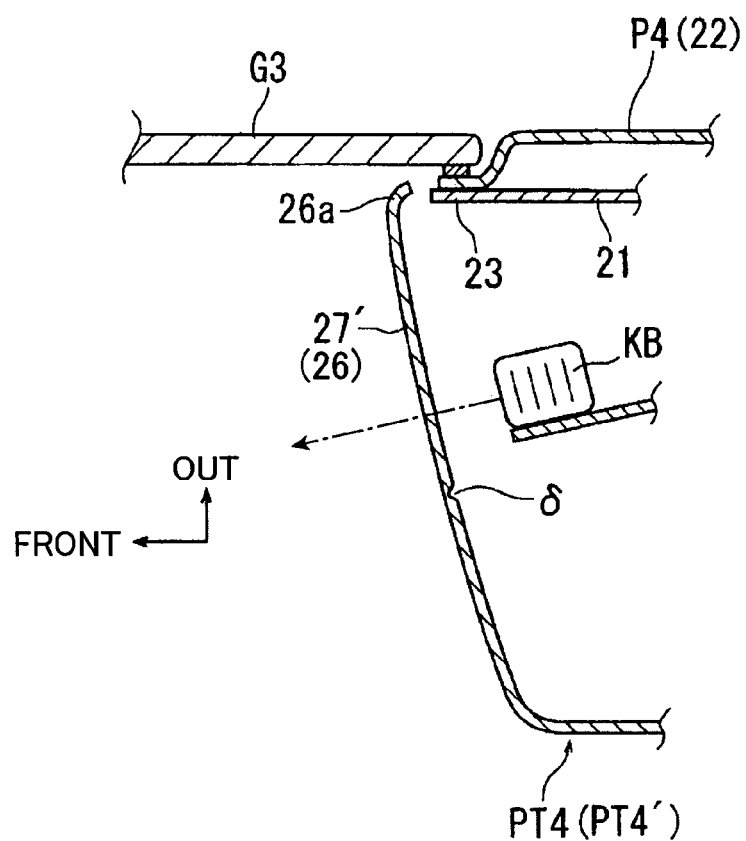
FIG. 11 is a fragmentary enlarged view showing a structure according to a third embodiment of the invention, FIG. 11 corresponding to part of the area shown in FIG. 9.

FIG. 11 is a fragmentary enlarged view showing a structure according to a third embodiment of the invention, in which elements like those of the foregoing embodiments are designated by like reference symbols. In this embodiment, a cover member 27' corresponding to the cover member 27 of the first embodiment is formed as an integral part of the rear pillar trim PT4, and there is formed a boundary groove (airbag deployment joint) δ in a back side of the front face portion 26 of the rear pillar trim PT4 at positions corresponding to the deployment joints γ1, γ2 of the first embodiment. The boundary groove ε is formed so deep that the front face portion 26 of the rear pillar trim PT4 is thin enough along the boundary groove ε to easily break when acted upon by a pressure produced as a result of inflation and deployment of the curtain airbag KB. While the structure of the third embodiment does not include any retaining part corresponding to the retaining projecting part 45a of the first embodiment shown in FIG. 9, the structure may be modified to include a retaining projecting part corresponding to the retaining projecting part 45a at a position more outward in the widthwise direction of the vehicle body than the curtain airbag KB for lightly holding the cover member 27' to the inner panel 21.

Fourth Embodiment

Figure 12:
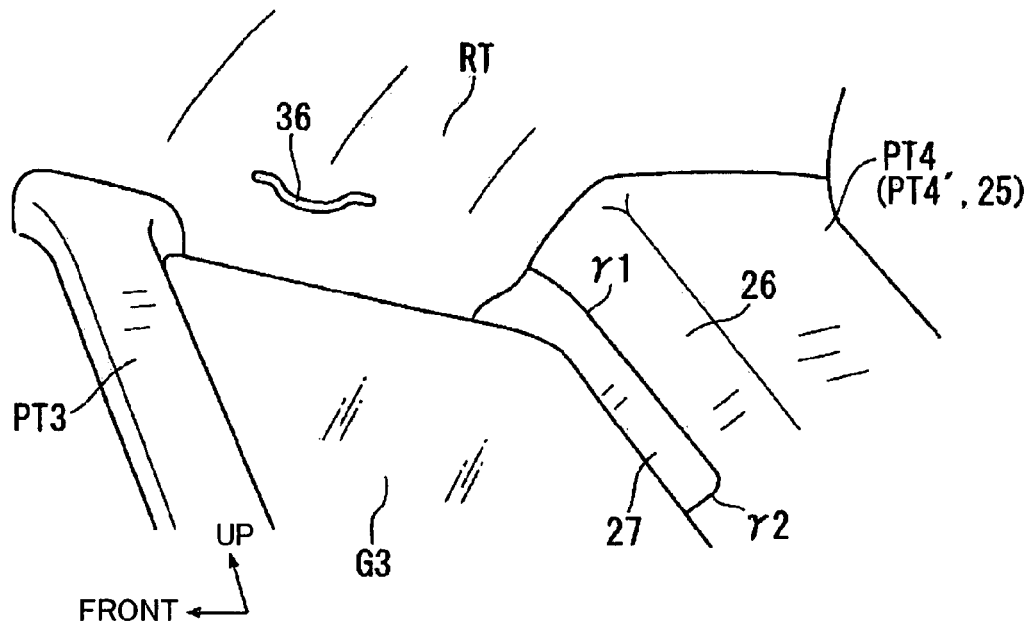
FIG. 12 is a perspective view corresponding to FIG. 4 showing a structure according to a fourth embodiment of the invention.
Figure 13:
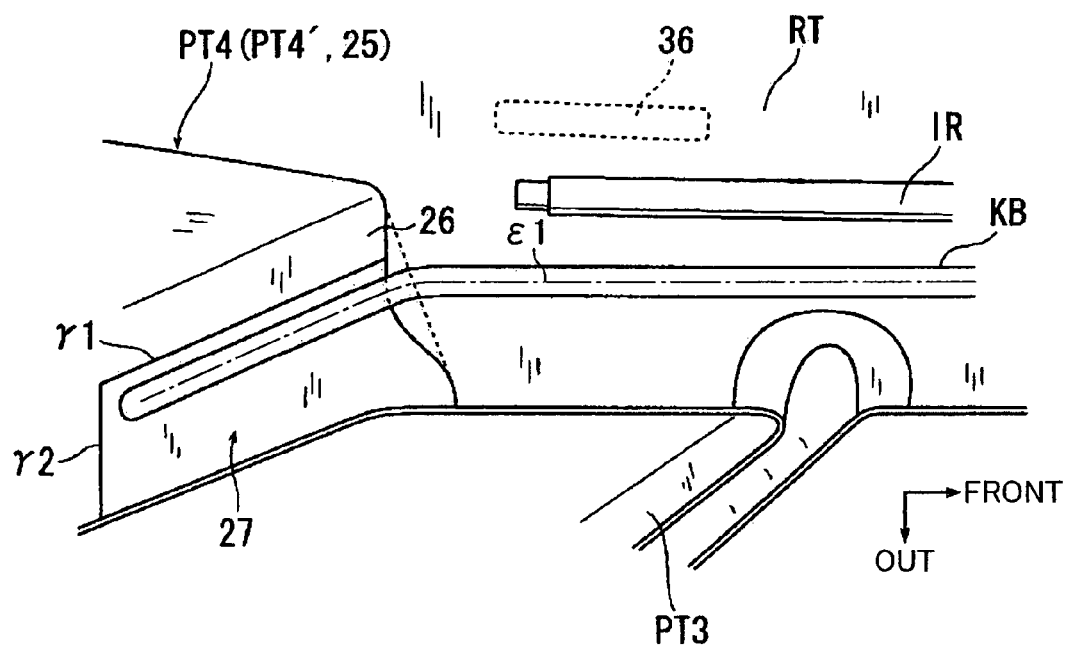
FIG. 13 is a plan view corresponding to FIG. 5 showing the structure according to the fourth embodiment of the invention.

FIGS. 12 and 13 are diagrams showing a structure according to a fourth embodiment of the invention, in which elements like those of the foregoing embodiments are designated by like reference symbols. What is characteristic of the fourth embodiment is that the structure thereof includes a cover member 27 which is structured as if the upper end of the cover member 27 of the first embodiment (or the cover member 27' of the third embodiment) is curved gradually downward and rearward inward along the widthwise direction of the vehicle body. This structure of the fourth embodiment serves to reduce an area in which the portion of the curtain airbag KB running along the rear edge of the side window glass G3 is covered by the cover member 27 from the front side in the retracted position, thereby improving the deployability of the curtain airbag KB to a corresponding degree. Especially because the upper end of the cover member 27 of the rear pillar trim PT4 is curved (inclined) obliquely downward inward along the widthwise direction of the vehicle body, there is created such an appreciable effect that allows the curtain airbag KB to slide along an upper edge of the cover member 27 toward the airbag deployment joint γ1 during deployment. This effect is advantageous for ensuring that the cover member 27 easily comes apart from the rear pillar trim body PT4' in a reliable fashion. It is to be noted that the above-described structure of the embodiment may be modified in such a way that the upper end of the cover member 27 (also, the cover member 27' in the third embodiment) is inclined gradually downward or rearward alone, and not both downward and rearward, inward along the widthwise direction of the vehicle body.

Fifth Embodiment

Figure 14:
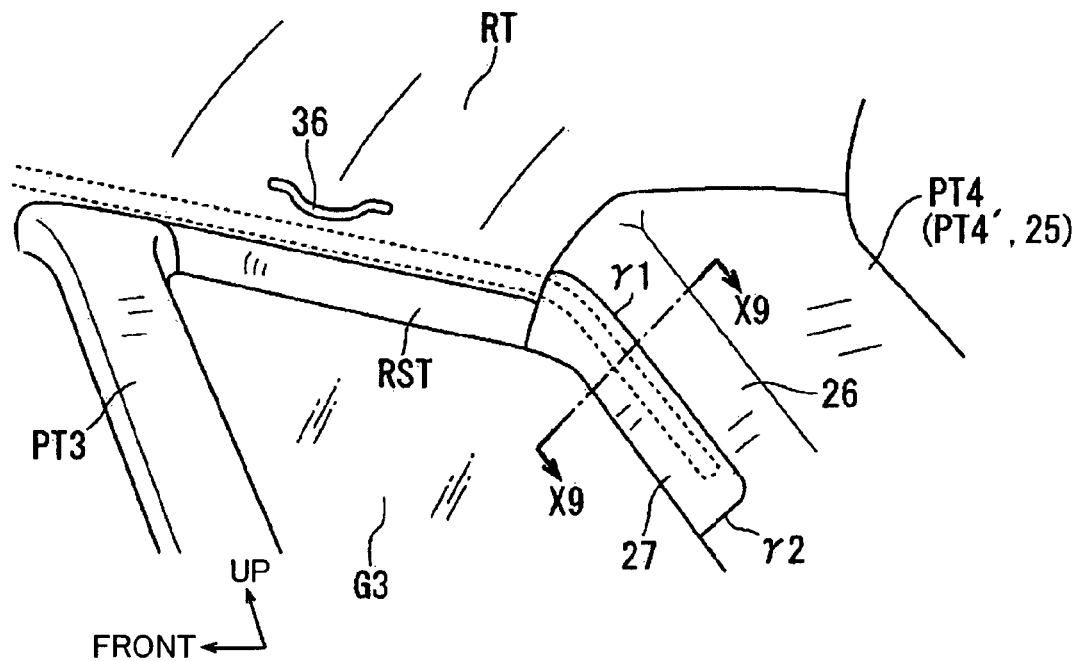
FIG. 14 is a perspective view corresponding to FIG. 4 showing a structure according to a fifth embodiment of the invention.
Figure 15:
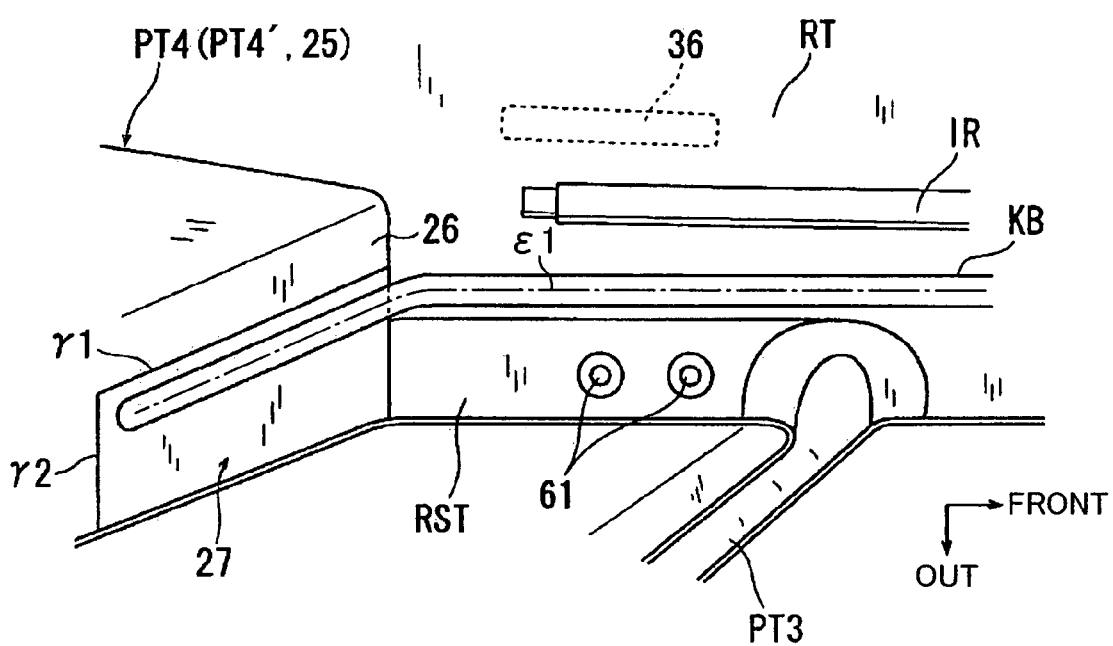
FIG. 15 is a plan view corresponding to FIG. 5 showing the structure according to the fifth embodiment of the invention.
Figure 16:
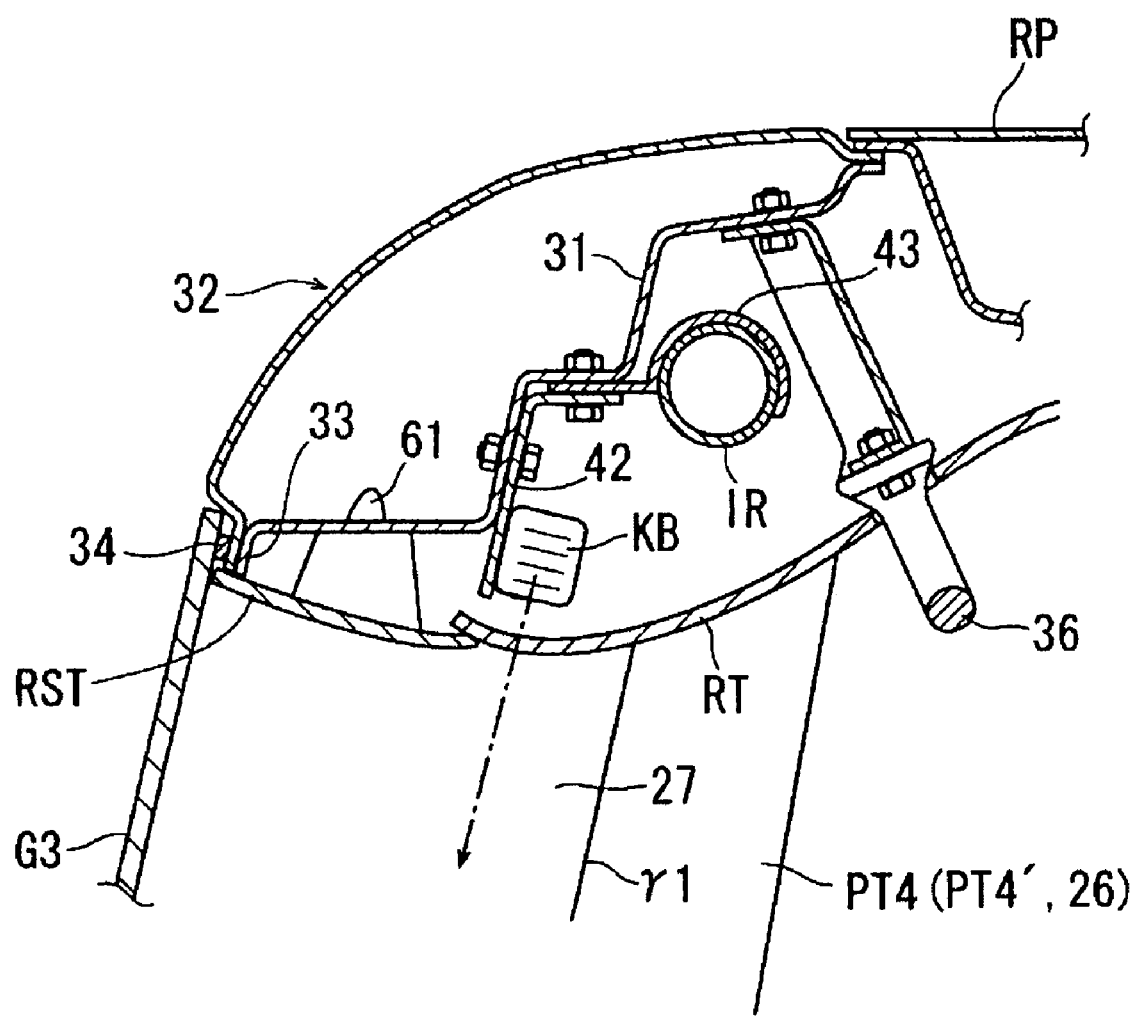
FIG. 16 is a cross-sectional view corresponding to FIG. 6 showing the structure according to the fifth embodiment of the invention.

FIGS. 14 to 16 are diagrams showing a structure according to a fifth embodiment of the invention, in which elements like those of the foregoing embodiments are designated by like reference symbols. What is characteristic of the fifth embodiment is that the structure thereof includes roof side trims RST which are trim members mounted along the upper edge of the side window glass G3 on each side, the trim members being formed separately from the roof trim RT using the same hard synthetic resin as the intermediate pillar trim PT3 and the rear pillar trim PT4.

While the roof side trim RST has approximately the same lateral width as the intermediate pillar trim PT3, the lateral width of the roof side trim RST is made sufficiently smaller than those of the front face portion 26 and the cover member 27 (or the cover member 27') of the rear pillar trim PT4. The roof side trim RST of this kind is employed in a case where openings formed in the vehicle body, such as the rear-end opening 10 opened and closed by the back door BD, are not large enough to allow the roof trim RT formed to a large size to pass through any opening in the vehicle V when the roof trim RT is to be moved from the exterior into the vehicle interior during installation of the roof trim RT on the bottom of the vehicle's roof. Portions of the roof trim RT which can not pass through any opening in the vehicle V are separately from the roof trim RT in the form of the roof side trims RST as discussed above to provide enhanced ease of assembly of the roof trim RT. Of course, there are cases where the separate roof side trims RST are installed for providing an improved appearance.

Compared to the structures of the first to fourth embodiments in which the roof trim RT is a soft member mounted along the upper edge of the side window glass G3, the structure of the fifth embodiment in which the roof side trim RST is a hard member mounted along the upper edge of the side window glass G3 is likely to develop a problem of how the curtain airbag KB should be deployed in a preferable fashion. This is because, although the soft roof trim RT easily deforms downward when acted upon by the pressure produced as a result of inflation and deployment of the curtain airbag KB in the first to fourth embodiments, the roof side trim RST of the fifth embodiment made of a hard material is relatively difficult to deform, which is disadvantageous for deploying the curtain airbag KB in a desired way.

Referring to FIGS. 15 and 16, the roof side trim RST of the present embodiment has on a top surface thereof a plurality of retaining projecting parts 61 for fixing the roof side trim RST to a bottom face of the roof side rail 32. The portion of the curtain airbag KB running along the upper edge of the side window glass G3 in the retracted position is disposed slightly more inward than the roof side trim RST in the widthwise direction of the vehicle body. With this arrangement, the curtain airbag KB inflates and deploys from the retracted position into the vehicle interior from between the roof side trim RST and the roof trim RT while deforming the roof trim RT downward when activated. While the roof side trim RST is firmly anchored to the feed channel 3 so that the roof side trim RST will not be displaced downward even when acted upon by the pressure produced as a result of inflation and deployment of the curtain airbag KB in the present embodiment, the structure of the embodiment may be modified such that points where the retaining projecting parts 61 fix the roof side trim RST to the roof side rail 32 shift slightly downward when the pressure produced as a result of inflation and deployment of the curtain airbag KB is exerted. In this case, however, the roof side trim RST should be allowed to shift downward only by a specific small amount without the risk of coming off the roof side rail 32.

According to the above-described structure of the fifth embodiment, the curtain airbag KB being deployed primarily pushes the upper end of the cover member 27 while scarcely pushing the roof side trim RST, thereby ensuring good deployability of the curtain airbag KB without causing interference between the curtain airbag KB and the roof side trim RST. Since the curtain airbag KB has the inflating portion between the rear pillar trim body PT4' and the side window glass G3 as stated earlier, the curtain airbag KB protects the occupant seated in the third-row seat SC over a wide area.

Sixth Embodiment

Figure 17:
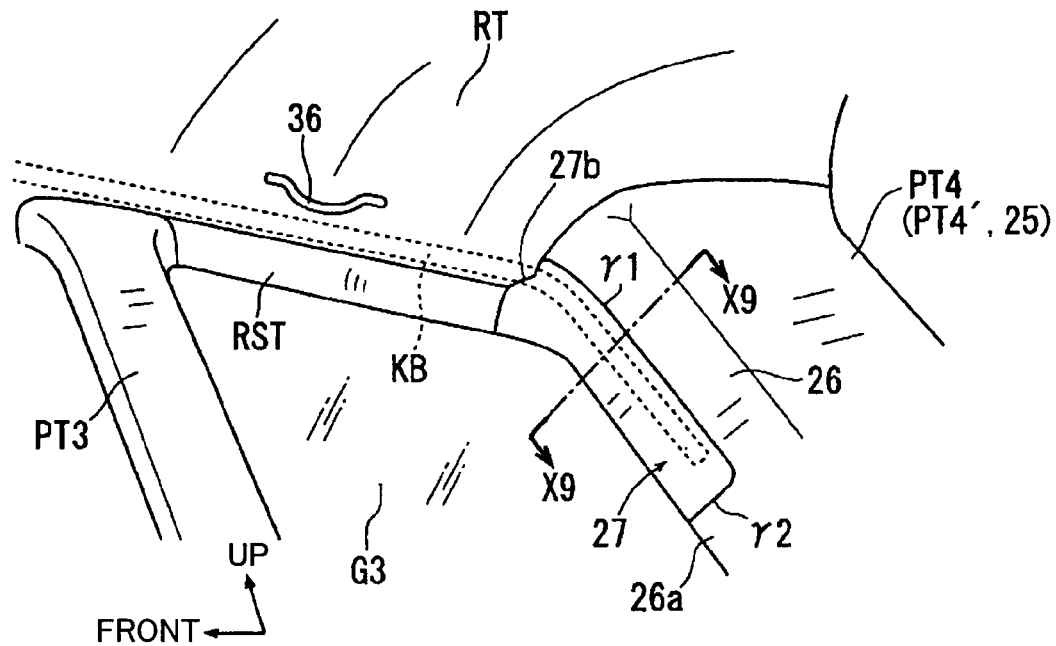
FIG. 17 is a perspective view corresponding to FIG. 4 showing a structure according to a sixth embodiment of the invention.
Figure 18:
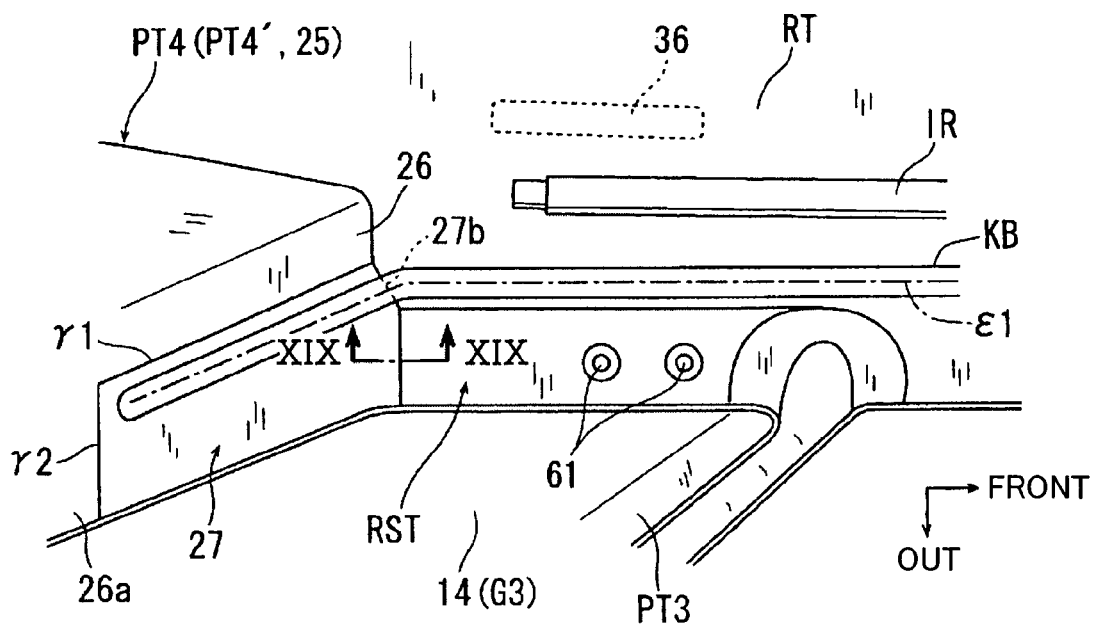
FIG. 18 is a plan view corresponding to FIG. 5 showing the structure according to the sixth embodiment of the invention.
Figure 19:
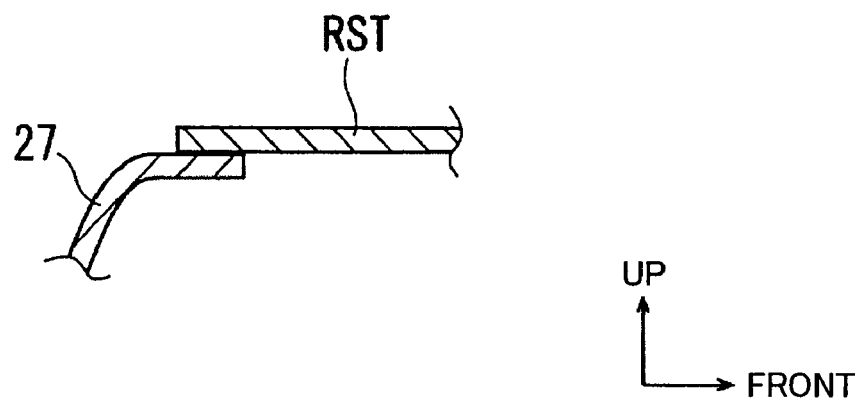
FIG. 19 is a cross-sectional view taken along lines XIX-XIX of FIG. 18.

FIGS. 17 to 19 are diagrams showing a structure according to a sixth embodiment of the invention, in which elements like those of the foregoing embodiments are designated by like reference symbols. The structure of the sixth embodiment is somewhat like the one which would be obtained when the fourth embodiment is applied to the structure of the fifth embodiment. Thus, as in the structure of the fourth embodiment, the upper end of the cover member 27 of the first embodiment (or the cover member 27' shown in FIG. 11) is curved (inclined) gradually downward and rearward inward along the widthwise direction of the vehicle body. A portion of the cover member 27 thus inclined at the upper end thereof is designated by the symbol 27b in FIGS. 17 and 18. This arrangement makes it possible to achieve advantages of both the fourth and fifth embodiments. Specifically, the curtain airbag KB can deploy in a preferable fashion without interfering with the roof side trim RST. Also, the structure of the sixth embodiment serves to decrease the area in which the portion of the curtain airbag KB running along the rear edge of the side window glass G3 is covered by the cover member 27 from the front side in the retracted position, thereby improving the deployability of the curtain airbag KB to a corresponding degree. Especially because the upper end of the cover member 27 of the rear pillar trim PT4 is curved (inclined) obliquely downward inward along the widthwise direction of the vehicle body, there is created such an appreciable effect that allows the curtain airbag KB to slide along the upper edge of the cover member 27 toward the airbag deployment joint γ1 during deployment. This effect is advantageous for ensuring that the cover member 27 easily comes apart from the rear pillar trim body PT4' in a reliable fashion. As is the case with the fourth embodiment, the above-described structure of the sixth embodiment may be modified in such a way that the upper end of the cover member 27 is inclined gradually downward or rearward alone, and not both downward and rearward, inward along the widthwise direction of the vehicle body.

FIG. 19 is a cross-sectional view taken along lines XIX-XIX of FIG. 18. In the present embodiment, the upper end of the cover member 27 overlaps a rear end of the roof side trim RST from underneath in the vehicle interior as illustrated in FIG. 19. This arrangement serves to provide an advantageous effect described below in addition to the aforementioned effect. Specifically, the arrangement of the present embodiment shown in FIG. 19 serves to prevent the roof side trim RST from hindering frontward movement of the cover member 27 in a reliable fashion when the cover member 27 is pushed forward by the curtain airbag KB being deployed, thereby providing even more improved deployability of the curtain airbag KB.

Seventh Embodiment

Figure 20:
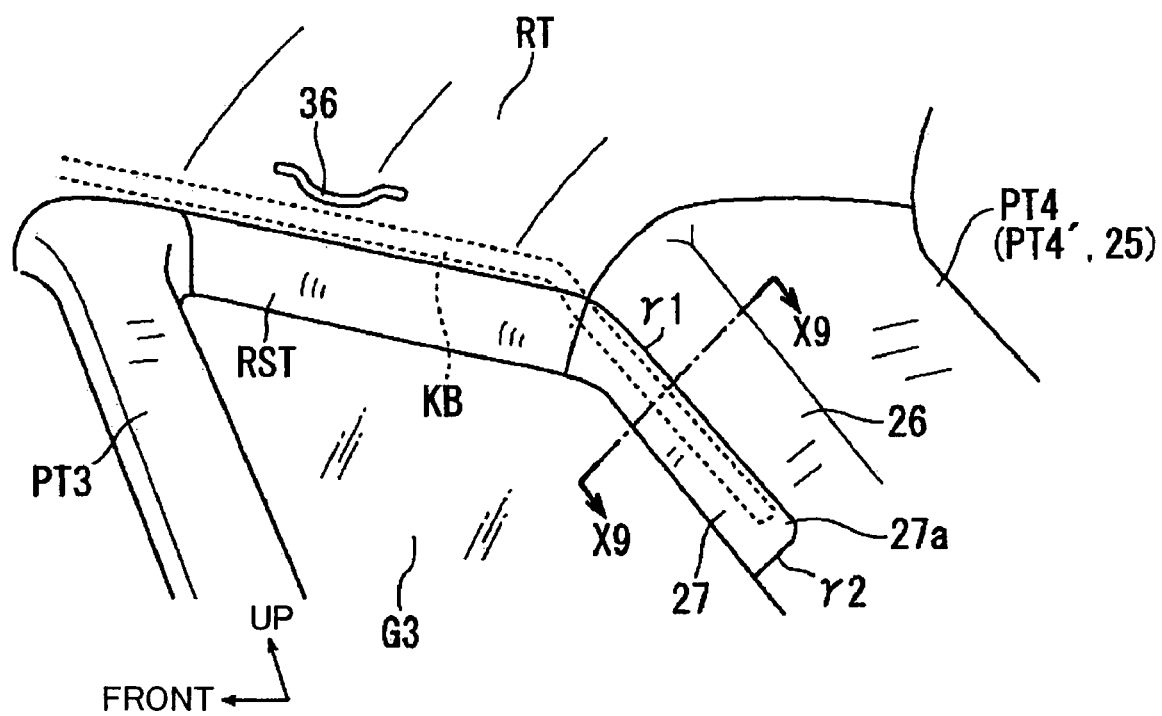
FIG. 20 is a perspective view corresponding to FIG. 4 showing a structure according to a seventh embodiment of the invention.
Figure 21:
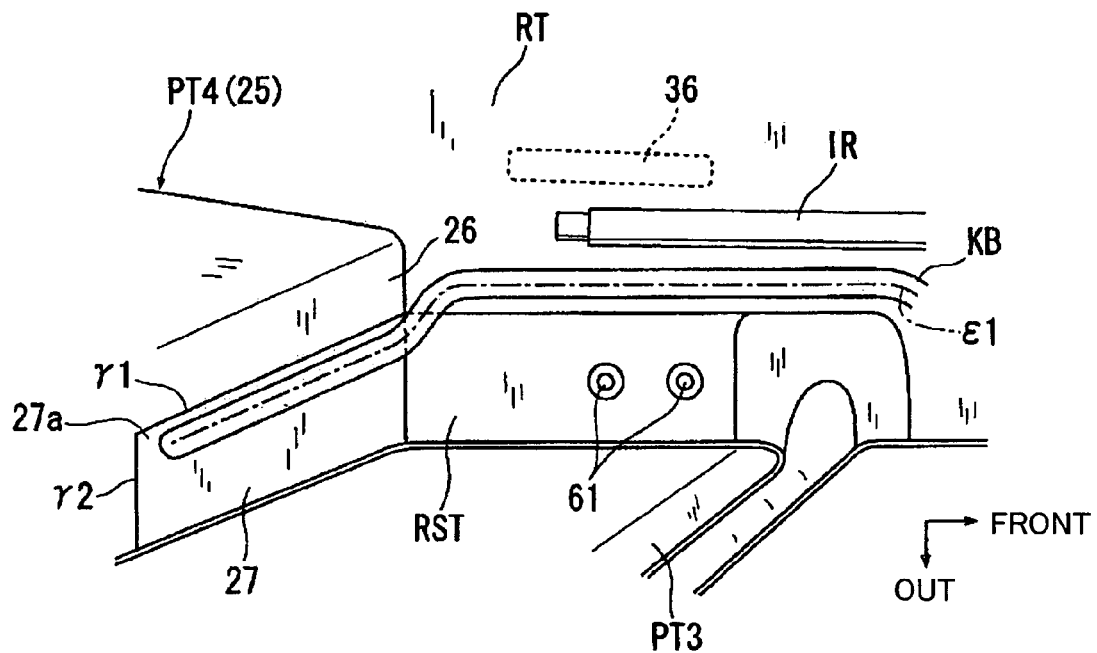
FIG. 21 is a plan view corresponding to FIG. 5 showing the structure according to the seventh embodiment of the invention.

FIGS. 20 and 21 are diagrams showing a structure according to a seventh embodiment of the invention, in which elements like those of the foregoing embodiments are designated by like reference symbols. The structure of the seventh embodiment is a variation of the fifth embodiment. In this embodiment, the roof side trim RST has approximately the same lateral width as the cover member 27 (or the cover member 27' shown in FIG. 11) of the rear pillar trim PT4. Since an inside edge of the roof side trim RST is situated almost exactly at the same lateral position as an inside edge (which corresponds to the airbag deployment joint γ1) of the cover member 27 as illustrated, the structure of the seventh embodiment serves to provide an improved appearance of the vehicle interior.

While a frontal portion of the curtain airbag KB in the retracted position is disposed to run generally in a straight line along the longitudinal direction of the vehicle body backward toward a point close to the rear end of the upper edge of the side window glass G3 (or close to the rear end of the roof side trim RST), the curtain airbag KB is curved to be positioned gradually outward in the widthwise direction of the vehicle body from the rear end of the upper edge of the side window glass G3 (the rear end of the roof side trim RST) toward the upper end of the cover member 27. A portion of the curtain airbag KB below part thereof thus curved extends obliquely downward generally in a straight line along the rear edge of the side window glass G3. The portion of the curtain airbag KB running along the rear edge of the side window glass G3 is thus offset outward in the widthwise direction of the vehicle body from the portion of the curtain airbag KB running along the upper edge of the side window glass G3.

The aforementioned curved part of the curtain airbag KB close to the rear end of the roof side trim RST is so positioned as to overlie the inside edge of the roof side trim RST at the rear end thereof in plan view and yet to be deployed in a direction toward the inside edge of the roof side trim RST at the rear end thereof. Since the curved part of the curtain airbag KB is disposed as described above in the retracted state, it is possible to prevent the curtain airbag KB from interfering with the difficult-to-deform rear pillar trim body PT4' during deployment of the curtain airbag KB as much as possible. This arrangement of the embodiment is preferable for providing good deployability of the curtain airbag KB. It is to be pointed out that the structure of the seventh embodiment may be modified to employ only one of the above-described features thereof, that is, such that the curtain airbag KB is so positioned as to overlie the inside edge of the roof side trim RST at the rear end thereof in plan view, or such that the curtain airbag KB is deployed in the direction toward the inside edge of the roof side trim RST at the rear end thereof. Since the roof side trim RST is small and apt to flex relatively easily, the rear end of the roof side trim RST can be easily downward. For this reason, the roof side trim RST does not substantially hinder deployment of the curtain airbag KB. In addition, to get rid of a hindrance to the deployment of the curtain airbag KB, the retaining projecting parts 61 may be made to hold the roof side trim RST in position with a small retaining effect.

Eighth Embodiment

Figure 22:
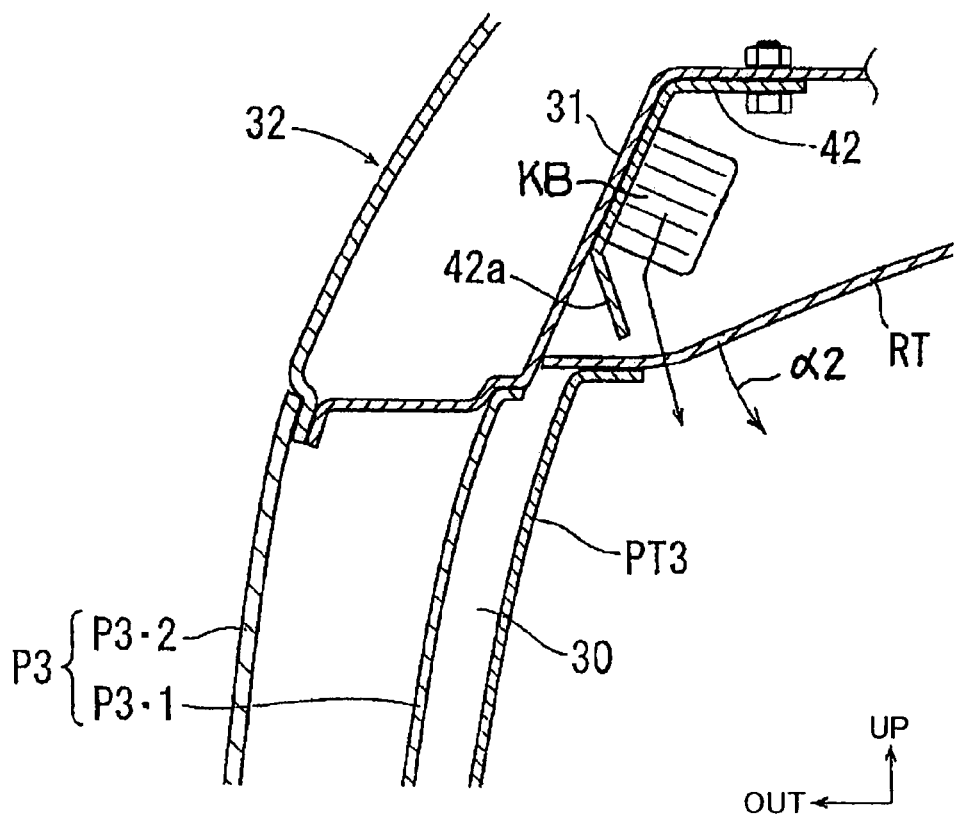
FIG. 22 is a cross-sectional view corresponding to FIG. 8 showing a structure according to an eighth embodiment of the invention.

FIG. 22 is a cross-sectional view corresponding to FIG. 8 showing a structure according to an eighth embodiment of the invention, in which elements like those of the foregoing embodiments are designated by like reference symbols. The structure of the eighth embodiment is another variation of the fifth embodiment, in which a portion described earlier with reference to FIG. 8 is modified. As seen in plan view, the curtain airbag KB in the retracted portion is so positioned as to overlap a small marginal part of the intermediate pillar trim PT3 along the longitudinal direction of the vehicle body. In this embodiment, the mounting bracket 42 holding the curtain airbag KB near the intermediate pillar trim PT3 has an elongated part 42a extending downward as depicted in FIG. 22. This elongated part 42a of the mounting bracket 42 is so inclined as to shift gradually inward in the widthwise direction of the vehicle body from top to bottom so that the elongated part 42a points to the inner edge of the upper end part of the intermediate pillar trim PT3 (or slightly more inward than the inner edge of the upper end part of the intermediate pillar trim PT3). The elongated part 42a of the mounting bracket 42 thus formed serves to guide the curtain airbag KB in such a way that the curtain airbag KB smoothly inflates and deploys into the vehicle interior in a reliable fashion when activated without entering the cavity 30 formed between the intermediate pillar P3 and the intermediate pillar trim PT3 or interfering with the intermediate pillar trim PT3 in any way.

While the invention has thus far been described specifically with reference to the preferred embodiments thereof, the invention is not limited thereto but may be modified within the spirit and scope of the appended claims as discussed in the following, for example.

The assist grip 36, which is a vehicle interior facility, need not necessarily be provided on the roof trim RT as shown in FIG. 6. Instead, there may be provided an opening of an air conditioner dust at the same location of the roof trim RT. Also, the invention is applicable not only to the aforementioned vehicle V having the back door BD but to a vehicle with no such back door.

While the invention is applied to the structure around the side window glass G3 at the third-row seat SC in the foregoing embodiments, the invention may be applied to a structure around the side window glass G1 (especially when the vehicle is not provided with the second-row and more backward seats) and to a structure around the side window glass G2 (especially when the vehicle is not provided with the third-row and more backward seats). Briefly, the invention is applicable if only the curtain airbag apparatus KBS disposed along a rear edge of a pane of side window glass in the retracted portion.

The curtain airbag apparatus KBS need not necessarily be formed of a single-piece curtain airbag but may be of a type including a plurality of curtain airbags separately arranged along the longitudinal direction of the vehicle body. Additionally, the rear pillar trim PT4 need not necessarily be generally L-shaped but may be modified as appropriate to have an arc shape, for instance, in horizontal cross section. To ensure that the curtain airbag KB will more positively withstand an external force exerted in the widthwise direction of the vehicle body during a process of inflation and deployment, the curtain airbag KB may be shaped such that a bottom part of the curtain airbag KB folded in the retracted portion is wider than other parts of the curtain airbag KB all along the length thereof.

While the rear end of the roof side trim RST is positioned immediately adjacent to the upper end of the rear pillar trim PT4 with almost no clearance formed in between in the above-described structures of the fifth to seventh embodiments, these structures may be modified such that there is formed a clearance between the rear end of the roof side trim RST and the upper end of the rear pillar trim PT4 and this clearance is covered with a small-sized soft trim member, for instance. Similarly, there may be formed a clearance between a forward end of the roof side trim RST and a rear end of the intermediate pillar trim PT3 with this clearance covered with a small-sized soft trim member, for instance, instead of positioning the former and the latter to lie immediately adjacent. Furthermore, the roof side trim RST may be formed as an integral part of the intermediate pillar trim PT3.

In summary, a structure of a rear portion of a vehicle furnished with a curtain airbag apparatus according to a principal aspect (first aspect) of the present invention includes a rear pillar located at a rear part of a vehicle body, side window glass fitted immediately at the front of the rear pillar, the aforementioned curtain airbag apparatus, a soft roof trim covering a roof panel from inside the vehicle interior, a rear pillar trim covering the rear pillar from inside the vehicle interior, the rear pillar trim being harder than the roof trim, and a cover constituting part of the rear pillar trim and covering a specific area of a frontal portion of the rear pillar trim including an outside peripheral part and an upper end part of the frontal portion thereof. The curtain airbag apparatus includes a curtain airbag which is fixed to the vehicle body close to the side window glass in a retracted state and an inflator for supplying gas pressure to the curtain airbag when activated, the curtain airbag apparatus being structured such that the curtain airbag inflated by the gas pressure fed from the inflator deploys into the vehicle interior along the side window glass to cover the side window glass from inside. The cover of the rear pillar trim is so structured as to be easily displaceable frontward along an airbag deployment joint which extends generally vertically at a specific position located inward from the outside peripheral part of the frontal portion of the rear pillar trim. In this structure, the curtain airbag is fixed to the vehicle body along an upper edge and a rear edge of the side window glass in the retracted state and, when inflated from the retracted state, deploys into the vehicle interior upon separating the aforementioned cover from the other part of the rear pillar trim along the airbag deployment joint and displacing the cover frontward.

According to the above-described structure of the invention, the cover of the rear pillar trim can easily be separated and displaced frontward from the other part of the rear pillar trim when acted upon by a forward pushing force produced by the curtain airbag during a process of inflation and deployment thereof. This structure serves to provide good deployability of the curtain airbag and prevent breakage of the rear pillar trim including the cover thereof.

The structure of the rear portion of the vehicle according to the aforementioned first aspect of the invention may further include an intermediate pillar located along a front edge of the side window glass, and an intermediate pillar trim covering the intermediate pillar from inside the vehicle interior, the intermediate pillar trim being harder than the roof trim. This structure should preferably be such that the curtain airbag in the retracted state is disposed along the upper edge of the side window glass generally in a straight line in plan view so that the curtain airbag stays approximately at the same lateral distance from the side window glass as at the intermediate pillar trim without being substantially offset sideways outward from the position at the intermediate pillar trim, and when inflated from the retracted state, the curtain airbag deploys down into the vehicle interior from between the roof trim and the intermediate pillar trim while deforming an outermost side edge part of the roof trim downward at the side of the intermediate pillar trim.

According to this structure, the curtain airbag in the retracted state is not much offset sideways along a portion running from the intermediate pillar trim rearward. This structure serves to prevent the curtain airbag being caught by the intermediate pillar trim during the process of airbag inflation and deployment and provide preferably improved deployability of the curtain airbag especially at the intermediate pillar trim and along the upper edge of the side window glass.

The structure of the rear portion of the vehicle according to the aforementioned first aspect of the invention may be such that the cover is formed as an integral part of the rear pillar trim, and the airbag deployment joint includes a boundary groove formed in the back of the frontal portion of the rear pillar trim, thereby making the frontal portion of the rear pillar trim so thin in part along the boundary groove as to break with ease.

According to this structure, the cover of the intermediate pillar trim is formed as an integral part thereof and the boundary groove formed in the back of the frontal portion of the rear pillar trim is invisible from inside the vehicle interior. This is preferable for providing an improved appearance of the vehicle interior.

The structure of the rear portion of the vehicle of the invention may be such that the rear pillar trim has a front face portion extending outward along a widthwise direction of the vehicle body over a large distance, and the airbag deployment joint is formed in the back of the front face portion of the rear pillar trim.

According to this structure, the rear pillar trim has the front face portion which is wide along the widthwise direction of the vehicle body so that a frontward pressure produced by a portion of the curtain airbag disposed along the rear edge of the side window glass during the process of airbag inflation and deployment effectively acts upon the cover in the front face portion of the rear pillar trim. This structure makes it possible to separate the cover along the airbag deployment joint and displace the cover frontward in a reliable fashion. This is preferable for achieving good deployability of the curtain airbag.

The structure of the rear portion of the vehicle according to the aforementioned first aspect of the invention may be such that the rear pillar trim includes a rear pillar trim body and a cover member which is formed separately from the rear pillar trim body, the cover member constituting the cover, and the curtain airbag deploys into the vehicle interior while deforming an inner edge part of the cover member frontward when inflated from the retracted state.

According to this structure, the cover the intermediate pillar trim is made of the cover member formed separately from the rear pillar trim body, so that the cover (cover member) acted upon by the forward pushing force produced by the curtain airbag during airbag deployment can be easily displaced frontward in a reliable fashion. This is preferable for further improving the deployability of the curtain airbag.

Also, the structure of the invention may be such that the inner edge part of the cover member overlaps the rear pillar trim body in such a way that the inner edge part of the cover member is located at the front of the rear pillar trim body.

This structure allows the cover member to be easily displaced frontward in a reliable fashion by the forward pushing force produced by the curtain airbag being deployed without any interference between the curtain airbag and the rear pillar trim body. This is preferable for still more improving the deployability of the curtain airbag.

Also, the structure of the invention may be such that the inner edge part of the cover member overlaps the rear pillar trim body in such a way that the inner edge part of the cover member can be displaced in the widthwise direction of the vehicle body relative to the rear pillar trim body.

According to this feature of the invention, the cover member and the rear pillar trim body can be joined in a simple fashion. Also, an overlapping part of the cover member and the rear pillar trim body serves to absorb dimensional disparities therebetween caused by a difference in thermal expansibility or manufacturing errors.

The structure of the rear portion of the vehicle according to the aforementioned first aspect of the invention may be such that an upper end of the cover is so shaped as to be directed obliquely in at least one of rearward and downward directions inward in the widthwise direction of the vehicle body in plan view and gradually downward inward in the widthwise direction of the vehicle body in front view.

This structure serves to reduce an area in which the curtain airbag in the retracted state is covered by the cover of the rear pillar trim as much as possible. Also, in this structure, the curtain airbag being deployed moves closer to the airbag deployment joint along an upper edge of the rear pillar trim at the front thereof as much as possible so that the curtain airbag pushes the airbag deployment joint in a reliable fashion. This is preferable for yet more improving the deployability of the curtain airbag.

The structure of the rear portion of the vehicle according to the aforementioned first aspect of the invention may be such that the curtain airbag has an inflating portion formed to be disposed between the side window glass and the outside peripheral part of the frontal portion of the rear pillar trim as a result of inflation and deployment of the curtain airbag.

This structure is preferable since the inflating portion of the curtain airbag protects an occupant seated in a seat provided, if any, to the side of the side window glass over a wide area.

The structure of the rear portion of the vehicle according to the aforementioned first aspect of the invention may further include an intermediate pillar to which a front edge of the side window glass is fixed, and an intermediate pillar trim covering the intermediate pillar from inside the vehicle interior, the intermediate pillar trim being harder than the roof trim. When the curtain airbag is in the retracted state in which the curtain airbag is accommodated along the upper edge of the side window glass, a portion of the curtain airbag running approximately at the same height as an upper end of the intermediate pillar trim at the rear thereof is not located more outward in the widthwise direction of the vehicle body than a portion of the curtain airbag passing by the intermediate pillar trim. Also, when inflated from the retracted state, the curtain airbag deploys down into the vehicle interior from between the roof trim and the intermediate pillar trim while deforming an outermost side edge part of the roof trim downward at the side of the intermediate pillar trim.

In this structure, the curtain airbag in the retracted state is not much offset sideways or twisted for altering airbag deploying direction all along the upper edge and the rear edge of the side window glass, which is advantageous for providing extremely good deployability of the curtain airbag. Additionally, the curtain airbag in the retracted state is located more outward in the widthwise direction of the vehicle body than the airbag deployment joint extending along an inside edge of the cover of the rear pillar trim. This ensures that the curtain airbag being inflated to deploy pushes the cover frontward and separates the same along the airbag deployment joint in a reliable fashion, thereby providing yet more improved deployability of the curtain airbag.

According to a second aspect of the invention, as compared to the first aspect thereof, the structure of the rear portion of the vehicle further include a roof side trim mounted along the upper edge of the side window glass between the upper edge of the side window glass and an outermost side edge part of the roof trim, wherein, when inflated from the retracted state, the curtain airbag deploys down into the vehicle interior from along an inside edge of the roof side trim while deforming the roof trim downward.

According to this structure, when the curtain airbag is inflated from the retracted state, a portion of the curtain airbag running along the rear edge of the side window glass in the retracted state deploys into the vehicle interior while easily deforming the cover frontward, whereas a portion of the curtain airbag running along the upper edge of the side window glass in the retracted state deploys into the vehicle interior while deforming the roof trim downward. This serves to ensure good deployability of the curtain airbag. Also, the structure according to the second aspect of the invention prevents forcible deformation of the rear pillar trim (especially the upper end part of the frontal portion thereof) as well as breakage of the rear pillar trim since the cover of the rear pillar trim can easily be displaced frontward when the curtain airbag is inflated. Furthermore, the roof side trim is kept from breaking because the roof side trim is not forcibly deformed during deployment of the curtain airbag.

The structure of the rear portion of the vehicle according to the aforementioned second aspect of the invention may further include an intermediate pillar located along a front edge of the side window glass, and an intermediate pillar trim covering the intermediate pillar from inside the vehicle interior, the intermediate pillar trim being harder than the roof trim. This structure should preferably be such that, when inflated from the retracted state, the curtain airbag deploys down into the vehicle interior from between an inner edge part of the intermediate pillar trim and the roof trim while deforming the roof trim downward.

This structure of the invention allows the curtain airbag to deploy into the vehicle interior in a preferable fashion by easily deforming the soft roof trim when inflated without interfering with the intermediate pillar trim.

The structure of the rear portion of the vehicle invention may be such that the cover is formed as an integral part of the rear pillar trim, and the airbag deployment joint includes a boundary groove formed in the back of the frontal portion of the rear pillar trim, thereby making the frontal portion of the rear pillar trim so thin in part along the boundary groove as to break with ease.

With the cover formed as an integral part of the rear pillar trim, this structure serves to facilitate manufacture and is advantageous for providing an improved appearance of the vehicle interior.

The structure of the rear portion of the vehicle according to the aforementioned second aspect of the invention may be such that the rear pillar trim includes a rear pillar trim body and a cover member which is formed separately and detachably from the rear pillar trim body, the cover member constituting the cover, and the curtain airbag deploys into the vehicle interior while deforming an inner edge part of the cover member frontward when inflated from the retracted state.

Since the cover member constituting the aforementioned cover of the rear pillar trim is formed separately from the rear pillar trim body as stated above, this structure allows the cover member to be displaced frontward with enhanced ease and reliability, thereby providing yet improved deployability of the curtain airbag.

The structure of the rear portion of the vehicle according to the aforementioned second aspect of the invention may be such that an inner edge part of the cover of the rear pillar trim close to an upper end thereof is located adjacent to the roof trim in an area located more inward in the widthwise direction of the vehicle body than an inner edge part of the roof side trim close to a rear end thereof.

This structure is preferable for ensuring that the cover member deploys into the vehicle interior upon pushing the cover open without interfering with the rear end of the roof side trim.

The structure of the rear portion of the vehicle according to the aforementioned second aspect of the invention may be such that an inner edge part of the cover close to an upper end thereof is located in the vicinity of an inner edge part of the roof side trim close to a rear end thereof.

This structure is preferable for providing an improved appearance of the vehicle interior.

The structure of the rear portion of the vehicle according to the aforementioned second aspect of the invention may be such that the curtain airbag in the retracted state overlies the upper end of the cover with the rear end of the roof side trim situated in between in plan view in an area around the rear end of the roof side trim, or such that the curtain airbag in the retracted state is disposed to have a deploying direction pointing toward the upper end of the cover by way of the rear end of the roof side trim in plan view in an area around the rear end of the roof side trim.

The curtain airbag thus arranged can exert a pushing force on the cover in a reliable fashion when inflated to deploy into the vehicle interior without substantially interfering with the rear pillar trim body. This is preferable for preventing breakage of the rear pillar trim body.

The structure of the rear portion of the vehicle according to the aforementioned second aspect of the invention may be such that the curtain airbag has an inflating portion formed to be disposed between the side window glass and the outside peripheral part of the frontal portion of the rear pillar trim as a result of inflation and deployment of the curtain airbag.

This structure is preferable for protecting the occupant seated in the seat provided to the side of the side window glass over a wide area.

The structure of the rear portion of the vehicle according to the aforementioned second aspect of the invention may further include an intermediate pillar to which a front edge of the side window glass is fixed, and an intermediate pillar trim covering the intermediate pillar from inside the vehicle interior, the intermediate pillar trim being harder than the roof trim. When the curtain airbag is in the retracted state in which the curtain airbag is accommodated along the upper edge of the side window glass, a portion of the curtain airbag running approximately at the same height as an upper end of the intermediate pillar trim at the rear thereof is not located more outward in the widthwise direction of the vehicle body than a portion of the curtain airbag passing by the intermediate pillar trim. Also, when inflated from the retracted state, the curtain airbag deploys down into the vehicle interior from between the roof trim and the intermediate pillar trim while deforming an outermost side edge part of the roof trim downward at the side of the intermediate pillar trim.

This structure serves to prevent the curtain airbag from being caught by the intermediate pillar trim even when the curtain airbag deploys in such a way as to create a tensile force acting in a longitudinal direction of the vehicle body when inflated to deploy.

The structure of the rear portion of the vehicle according to the invention may be such that a portion of the curtain airbag running along the upper edge of the side window glass in the retracted state extends generally in a straight line along a longitudinal direction of the vehicle body under conditions where the curtain airbag is separated from the side window glass inward in the widthwise direction, a portion of the curtain airbag running along the rear edge of the side window glass in the retracted state extends generally in a straight line while staying approximately at the same lateral distance from the side window glass as the portion of the curtain airbag running along the upper edge of the side window glass without being substantially offset sideways therefrom, the curtain airbag in the retracted state is disposed without being substantially twisted all along the portions of the curtain airbag running along the upper edge to the rear edge of the side window glass, the curtain airbag in the retracted state is disposed to have a generally frontward deploying direction at the portion running along the upper edge of the side window glass and a generally frontward deploying direction at the portion running along the rear edge of the side window glass, and the airbag deployment joint constituting an inside boundary of the cover is located more inward in the widthwise direction of the vehicle body than the curtain airbag in the retracted state at the portions thereof running along the upper edge and the rear edge of the side window glass.

This structure also serves to prevent the curtain airbag from being caught by the intermediate pillar trim even when the curtain airbag deploys in such a way as to create a tensile force acting in the longitudinal direction of the vehicle body when inflated to deploy.

This application is based on Japanese Patent Application Nos. 2006-82591 and 2006-82592, both of which were filed with Japan Patent Office on Mar. 24, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A structure of a rear portion of a vehicle furnished with a curtain airbag apparatus, said structure comprising:
a rear pillar located at a rear part of a vehicle body;
a side window glass fitted immediately at the front of said rear pillar;
said curtain airbag apparatus including a curtain airbag which is fixed to the vehicle body close to said side window glass in a retracted state and an inflator for supplying gas pressure to the curtain airbag when activated, said curtain airbag apparatus being structured such that the curtain airbag inflated by the gas pressure fed from the inflator deploys into the vehicle interior along said side window glass to cover said side window glass from inside;
a soft roof trim covering a roof panel from inside the vehicle interior;
a rear pillar trim covering said rear pillar from inside the vehicle interior, said rear pillar trim being harder than said roof trim; and
a cover constituting part of said rear pillar trim and covering a specific area of a frontal portion of said rear pillar trim including an outside peripheral part and an upper end part of the frontal portion thereof, said cover being so structured as to be easily displaceable frontward along an airbag deployment joint which extends generally vertically at a specific position located inward from the outside peripheral part of the frontal portion of said rear pillar trim;
wherein said curtain airbag is fixed to the vehicle body along an upper edge and a rear edge of said side window glass in the retracted state and, when inflated from the retracted state, deploys into the vehicle interior upon separating said cover from the other part of said rear pillar trim along the airbag deployment joint and displacing said cover frontward,
wherein said rear pillar trim includes a rear pillar trim body and a cover member, the cover member being formed separately from the rear pillar trim body, the cover member constituting said cover, and said curtain airbag deploys into the vehicle interior while deforming an inner edge part of the cover member frontward when inflated from the retracted state, and
said cover member is provided on a front face portion of said rear pillar trim, said front face portion extends in a widthwise direction of the vehicle.

2. The structure of the rear portion of the vehicle according to claim 1, said structure further comprising:
an intermediate pillar located along a front edge of said side window glass; and
an intermediate pillar trim covering said intermediate pillar from inside the vehicle interior, said intermediate pillar trim being harder than said roof trim;
wherein said curtain airbag in the retracted state is disposed along the upper edge of said side window glass generally in a straight line in plan view so that said curtain airbag stays approximately at the same lateral distance from said side window glass as at said intermediate pillar trim without being substantially offset sideways outward from the position at said intermediate pillar trim; and
wherein, when inflated from the retracted state, said curtain airbag deploys down into the vehicle interior from between said roof trim and said intermediate pillar trim while deforming an outermost side edge part of said roof trim downward at the side of said intermediate pillar trim.

3. The structure of the rear portion of the vehicle according to claim 1, wherein the inner edge part of the cover member overlaps said rear pillar trim body in such a way that the inner edge part of the cover member is located at the front of said rear pillar trim body.

4. The structure of the rear portion of the vehicle according to claim 3, wherein the inner edge part of the cover member overlaps said rear pillar trim body in such a way that the inner edge part of the cover member can be displaced in the widthwise direction of the vehicle body relative to said rear pillar trim body.

5. The structure of the rear portion of the vehicle according to claim 1 wherein an upper end of said cover is so shaped as to be directed obliquely in at least one of rearward and downward directions inward in the widthwise direction of the vehicle body in plan view and gradually downward inward in the widthwise direction of the vehicle body in front view.

6. The structure of the rear portion of the vehicle according to claim 1, wherein said curtain airbag has an inflating portion formed to be disposed between said side window glass and the outside peripheral part of the frontal portion of said rear pillar trim as a result of inflation and deployment of said curtain airbag.

7. The structure of the rear portion of the vehicle according to claim 1, said structure further comprising:
an intermediate pillar to which a front edge of said side window glass is fixed; and
an intermediate pillar trim covering said intermediate pillar from inside the vehicle interior, said intermediate pillar trim being harder than said roof trim;
wherein, when said curtain airbag is in the retracted state in which said curtain airbag is accommodated along the upper edge of said side window glass, a portion of said curtain airbag running approximately at the same height as an upper end of said intermediate pillar trim at the rear thereof is not located more outward in the widthwise direction of the vehicle body than a portion of said curtain airbag passing by said intermediate pillar trim; and
wherein, when inflated from the retracted state, said curtain airbag deploys down into the vehicle interior from between said roof trim and said intermediate pillar trim while deforming an outermost side edge part of said roof trim downward at the side of said intermediate pillar trim.

8. The structure of the rear portion of the vehicle according to claim 1, said structure further comprising:
a roof side trim mounted along the upper edge of said side window glass between the upper edge of said side window glass and an outermost side edge part of said roof trim;
wherein, when inflated from the retracted state, said curtain airbag deploys down into the vehicle interior from along an inside edge of said roof side trim while deforming said roof trim downward.

9. The structure of the rear portion of the vehicle according to claim 8, said structure further comprising:
an intermediate pillar to which a front edge of said side window glass is fixed; and
an intermediate pillar trim covering said intermediate pillar from inside the vehicle interior, said intermediate pillar trim being harder than said roof trim;
wherein, when said curtain airbag is in the retracted state in which said curtain airbag is accommodated along the upper edge of said side window glass, a portion of said curtain airbag running approximately at the same height as an upper end of said intermediate pillar trim at the rear thereof is not located more outward in the widthwise direction of the vehicle body than a portion of said curtain airbag passing by said intermediate pillar trim; and wherein, when inflated from the retracted state, said curtain airbag deploys down into the vehicle interior from between said roof trim and said intermediate pillar trim while deforming an outermost side edge part of said roof trim downward at the side of said intermediate pillar trim.

10. The structure of the rear portion of the vehicle according to claim 8 wherein said curtain airbag has an inflating portion formed to be disposed between said side window glass and the outside peripheral part of the frontal portion of said rear pillar trim as a result of inflation and deployment of said curtain airbag.

11. The structure of the rear portion of the vehicle according to claim 8, said structure further comprising:

an intermediate pillar located along a front edge of said side window glass; and an intermediate pillar trim covering said intermediate pillar from inside the vehicle interior, said intermediate pillar trim being harder than said roof trim;

wherein, when inflated from the retracted state, said curtain airbag deploys down into the vehicle interior from between an inner edge part of said intermediate pillar trim and said roof trim while deforming said roof trim downward.

12. The structure of the rear portion of the vehicle according to claim 8, wherein said rear pillar trim includes a rear pillar trim body and a cover member which is formed separately and detachably from the rear pillar trim body, the cover member constituting said cover, and said curtain airbag deploys into the vehicle interior while deforming an inner edge part of the cover member frontward when inflated from the retracted state.

13. The structure of the rear portion of the vehicle according to claim 8, wherein an inner edge part of said cover close to an upper end thereof is located adjacent to said roof trim in an area located more inward in the widthwise direction of the vehicle body than an inner edge part of said roof side trim close to a rear end thereof.

14. The structure of the rear portion of the vehicle according to claim 8, wherein an inner edge part of said cover close to an upper end thereof is located in the vicinity of an inner edge part of said roof side trim close to a rear end thereof.

15. The structure of the rear portion of the vehicle according to claim 14, wherein said curtain airbag in the retracted state overlies the upper end of said cover with the rear end of said roof side trim situated in between in plan view in an area around the rear end of said roof side trim.

16. The structure of the rear portion of the vehicle according to claim 14, wherein said curtain airbag in the retracted state is disposed to have a deploying direction pointing toward the upper end of said cover by way of the rear end of said roof side trim in plan view in an area around the rear end of said roof side trim.

17. The structure of the rear portion of the vehicle according to claim 1, wherein a portion of said curtain airbag running along the upper edge of said side window glass in the retracted state extends generally in a straight line along a longitudinal direction of the vehicle body under conditions where said curtain airbag is separated from said side window glass inward in the widthwise direction, a portion of said curtain airbag running along the rear edge of said side window glass in the retracted state extends generally in a straight line while staying approximately at the same lateral distance from said curtain airbag as the portion of said curtain airbag running along the upper edge of said side window glass without being substantially offset sideways therefrom, said curtain airbag in the retracted state is disposed without being substantially twisted all along the portions of said curtain airbag running along the upper edge to the rear edge of said side window glass, said curtain airbag in the retracted state is disposed to have a generally frontward deploying direction at the portion running along the upper edge of said side window glass and a generally frontward deploying direction at the portion running along the rear edge of said side window glass, and the airbag deployment joint constituting an inside boundary of said cover is located more inward in the widthwise direction of the vehicle body than said curtain airbag in the retracted state at the portions thereof running along the upper edge and the rear edge of said side window glass.

18. The structure of the rear portion of the vehicle according to claim 1, wherein the portion of said airbag corresponding to the cover member, in its entirety, deploys forward when the airbag is inflated from the retracted state.

\* \* \* \* \*